United States Patent
Sasaki et al.

(10) Patent No.: US 7,547,500 B2
(45) Date of Patent: Jun. 16, 2009

(54) BINDER RESIN FOR ELECTROSTATIC IMAGE DEVELOPING TONER, BINDER RESIN LIQUID DISPERSION FOR ELECTROSTATIC IMAGE DEVELOPING TONER, ELECTROSTATIC IMAGE DEVELOPING TONER, AND PRODUCTION PROCESSES THEREOF

(75) Inventors: Yuki Sasaki, Minamiashigara (JP); Satoshi Hiraoka, Minamiashigara (JP); Fumiaki Mera, Minamiashigara (JP); Hirotaka Matsuoka, Minamiashigara (JP); Yasuo Matsumura, Minamiashigara (JP)

(73) Assignee: Fuji Xerox Co., Ltd., Tokyo (JP)

(*) Notice: Subject to any disclaimer, the term of this patent is extended or adjusted under 35 U.S.C. 154(b) by 434 days.

(21) Appl. No.: 11/298,847

(22) Filed: Dec. 12, 2005

(65) Prior Publication Data

US 2007/0048646 A1    Mar. 1, 2007

(30) Foreign Application Priority Data

Aug. 26, 2005  (JP) .............................. 2005-246136

(51) Int. Cl.
G03G 9/00 (2006.01)
(52) U.S. Cl. .............................. 430/109.4; 430/137.14; 430/124.1; 524/846; 524/611; 525/168
(58) Field of Classification Search .............. 430/109.4, 430/124.1, 137.14; 524/846, 611; 525/168
See application file for complete search history.

(56) References Cited

U.S. PATENT DOCUMENTS

| 7,269,380 B2 | 9/2007 | Yamada |
| 2004/0167021 A1 | 8/2004 | Kung et al. |
| 2004/0265718 A1 | 12/2004 | Nakamura et al. |

FOREIGN PATENT DOCUMENTS

| CN | 1577145 A | 2/2005 |
| EP | 0 720 062 A1 | 7/1996 |
| JP | A 56-001952 | 1/1981 |
| JP | A 58-017452 | 2/1983 |
| JP | A 04-242752 | 8/1992 |
| JP | A-8-334930 | 12/1996 |
| JP | A-09-152743 | 6/1997 |
| JP | A 10-078679 | 3/1998 |
| JP | A 10-130380 | 5/1998 |
| JP | A-11-302361 | 11/1999 |
| JP | A 11-313692 | 11/1999 |
| JP | A-2002-072548 | 3/2002 |
| JP | A 2003-055302 | 2/2003 |
| JP | A 2003-261662 | 9/2003 |
| JP | A 2003-306535 | 10/2003 |
| JP | A-2004-133320 | 4/2004 |
| JP | A 2004-217721 | 8/2004 |
| JP | A-2005-140987 | 6/2005 |

OTHER PUBLICATIONS

Hozumi Tanaka et al., "Synthesis of Polyesters by Emulsion Polycondensation Reaction in Water", Polymer Journal, vol. 35, No. 4, pp. 359-363 (2003).
Kazuaki Ishihara et al., Direct Condensation of Carboxylic Acids with Alcohols Catalyzed Hafnium (IV) Salts, Science, vol. 290, 10, pp. 1140-1142 (2000).

*Primary Examiner*—Mark A Chapman
(74) *Attorney, Agent, or Firm*—Oliff & Berridge PLC

(57) ABSTRACT

A binder resin for an electrostatic image developing toner, obtained by polycondensation reaction of a polycarboxylic acid and a polyol, wherein the polycarboxylic acid comprises at least one of a compound represented by formula (1) and a compound represented by formula (2) in an amount of from 50 to 100 mol %, the polyol comprises a compound represented by formula (3) in an amount of from 50 to 100 mol %, and a content of a catalyst-originated metal element in the resin is 100 ppm or less:

$$R^1OOCA^1{}_mB^1{}_nA^1{}_lCOOR^{1'} \quad (1)$$

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$);

$$R^2OOCA^2{}_pB^2{}_qA^2{}_rCOOR^{2'} \quad (2)$$

(wherein $A^2$ is a methylene group, $B^2$ is an alicyclic hydrocarbon group, $R^2$ and $R^{2'}$ each is a hydrogen atom or a monovalent hydrocarbon group, $0 \leq p \leq 6$, $0 \leq r \leq 6$, and $1 \leq q \leq 3$);

$$HOX_hY_jX_kOH \quad (3)$$

(wherein X is an alkylene oxide group, Y is a bisphenol structure group, $1 \leq h+k \leq 10$, and $1 \leq j \leq 3$).

22 Claims, No Drawings

BINDER RESIN FOR ELECTROSTATIC IMAGE DEVELOPING TONER, BINDER RESIN LIQUID DISPERSION FOR ELECTROSTATIC IMAGE DEVELOPING TONER, ELECTROSTATIC IMAGE DEVELOPING TONER, AND PRODUCTION PROCESSES THEREOF

BACKGROUND OF THE INVENTION

1. Field of the Invention

The present invention relates to a binder resin for an electrostatic image developing toner which is used when an electrostatic latent image formed by an electrophotographic process, an electrostatic recording process or the like is developed with a developer, and also relates to an electrostatic image developing toner produced by kneading and pulverizing the binder resin. Furthermore, the present invention relates to a binder resin liquid dispersion for an electrostatic image developing toner, produced from the binder resin, and an electrostatic image developing toner produced by using the binder resin liquid dispersion. In addition, the present invention relates to an electrostatic image developer using the electrostatic image developing toner, and an image forming method.

2. Description of the Related Art

With rapid spread of digitization technology, high image quality is currently demanded for the output such as print and copy by users at the home or office or in the publishing field. Meanwhile, demands for low energy and energy saving in corporate activities and activity result products are increasing so as to realize a sustainable society. To keep up with this trend, also in the image forming method by an electrophotographic process, an electrostatic recording process or the like, electric power saving in the fixing step which involves a large energy consumption, or implementation of an activity with a low environmental load in the step of producing a product by using the obtained material is required. Examples of the countermeasure for the former include more reduction in the toner fixing temperature. When the toner fixing temperature is lowered, in addition to power saving, the waiting time until the fixing member surface reaches the fixing possible temperature after turning on the power source, so-called warm-up time, can be shortened and the life of the fixing member can be prolonged.

Incidentally, as for the binder resin of a toner, a vinyl-based polymer has been heretofore widely used and for obtaining a non-offset property, use of a polymer having a high molecular weight has been proposed. However, a vinyl-based polymer having a high molecular weight has a high softening point and the temperature of a heat roller must be set high so as to obtain a fixed image with excellent glossiness, but this results in reverse movement against energy saving. Furthermore, a toner using a vinyl-based polymer is liable to be attacked by the plasticizer of a plasticized vinyl chloride and has a problem that on coming into contact with the plasticizer, the toner itself is plasticized to bear tackiness and contaminate the plasticized vinyl chloride product (hereinafter referred to as "vinyl chloride resistance property").

On the other hand, a polyester resin has an excellent vinyl chloride resistance property, and a polyester resin having a low molecular weight can be relatively easily produced. Furthermore, a toner having blended therein a polyester resin as the binder resin is advantageous in that when the toner is melted, good wetting to a support such as transfer paper is exhibited as compared with a toner having blended therein a vinyl-based polymer as the binder resin, and sufficient fixing can be performed at a lower temperature as compared with a case using a vinyl-based polymer having a nearly equal softening point. Therefore, a polyester resin is being used as the binder resin for an energy-saving toner in many cases.

Also in JP-A-4-242752, a polyester obtained from a terephthalic acid/a bisphenol A-ethylene oxide adduct/a cyclohexanedimethanol and having, for example, a number average molecular weight of 3,000 to 3,600, a weight average molecular weight of 8,700 to 9,500, a softening point of 100 to 125° C. and a glass transition point of 55 to 68° C., is used as the binder resin. This polyester is excellent in the production stability and fixing strength by virtue of high strength attributable to the property of the raw material but is disadvantageously very poor in the pulverization property at the production of a toner.

In this way, a non-crystalline polyester resin obtained by polycondensing mainly an aromatic polyvalent carboxylic acid (e.g., terephthalic acid, isophthalic acid), an aliphatic unsaturated carboxylic acid (e.g., fumaric acid, maleic acid), a diol having a bisphenol structure, and an alicyclic diol (e.g., aliphatic diol, cyclohexanedimethanol) has been conventionally used as the polyester binder resin and a large number of patents have been proposed. Also, studies on an alicyclic dicarboxylic acid such as cyclohexanedicarboxylic acid are being made.

For example, in JP-A-56-1952 and JP-A-58-17452, an electrophotographic toner composition using a polyester resin has been proposed, in which the polyester resin is obtained by atmospheric pressure polymerization from a cyclohexene-dicarboxylic acid (cyclohexylene dicarboxylic acid) anhydride or cyclohexanedicarboxylic acid anhydride as the polyvalent carboxylic acid component and a polyhydric alcohol having a bisphenol structure. An object of such an invention is to elevate the glass transition point of a polyester resin and improve the storage stability of the toner, but in this production process, when an alicyclic polyvalent carboxylic acid is used, the molecular weight can be hardly increased by the atmospheric pressure polymerization and since only a resin having a low molecular weight can be obtained, the storage stability is sometimes impaired after all.

In JP-A-10-78679, an electrostatic image developing toner has been proposed, which is characterized by comprising, as the main constituent component, a polyester resin having a glass transition point of 50° C. or more obtained by the polycondensation of a polyvalent carboxylic acid containing 5% or more of a cyclohexanedicarboxylic acid, and a polyhydric alcohol mainly comprising an aliphatic diol or an alicyclic diol and having an aromatic polyhydric alcohol content of 5 mol % or less. It is stated that by this combination, an offset phenomenon at the heat fixing can be avoided and a high-grade image can be obtained.

Similarly, in JP-A-10-130380, for the purpose of improving the transparency, a polyester resin comprising a hydrogenated bisphenol in which the polyhydric alcohol has at least a cyclohexane structure has been proposed.

Also, in JP-A-2004-217721, for the purpose of enhancing the hydrolysis resistance, a polyester having a certain intrinsic viscosity and a certain acid value at the polymer terminal is disclosed, in which out of the constituent components of the polyester, the dicarboxylic acid component comprises an alicyclic dicarboxylic acid component as the main component, and the diol component comprises from 80 to 99.95 mol % of an alicyclic diol component and from 0.05 to 20 mol % of an alkylene diol component having a carbon number of 2 to 10.

In this way, studies on the polymerization components as raw materials of a polyester binder resin are continuing with an attempt to enhance the toner properties, but the polyester binder resin has an inherent problem that the fine line reproducibility is poor. This problem is considered to be attributable to the catalyst contained in the binder resin. Furthermore, the above-described resins all are produced by a production process usually requiring a high energy. In a general polycondensation process, a reaction over 10 hours or more with stirring by a great power under highly reduced pressure at a high temperature exceeding 200° C. is necessary and a large energy consumption is incurred. Accordingly, a huge facility investment is required in many cases so as to obtain durability of the reaction facility.

On the other hand, studies for shifting the production process of a polyester resin from a large energy consumption type to a low energy consumption type have been also reported. For example, in JP-A-2003-55302 and JP-A-2003-261662, an in-water dehydration reaction process or polycondensation process comprising performing a dehydration reaction in water in the presence of a surfactant is disclosed. Also, in JP-A-11-313692, a process for producing a polyester by using an enzyme catalyst is disclosed and for example, a reaction of a sebacic acid and a butanediol at 60° C. in an argon atmosphere is described. In JP-A-2003-306535, synthesis of a polyester by using a scandium triflate catalyst is reported and polycondensation of a butanediol and a succinic acid at 160 to 200° C. which is lower than the conventional polyester polycondensation temperature of 200 to 240° C., is described.

However, there is not known a synthesis example of a non-crystalline polyester by such low-temperature polycondensation. For example, in *Polymer Journal*, Vol. 35, No. 4, pp. 359-363 (2003), it is reported that a decanediol and an isophthalic acid or terephthalic acid, or bisphenol A and a sebacic acid were reacted at 70° C. in water in the presence of a dodecyl-benzenesulfonic acid catalyst, but the reaction did not proceed. Similarly, in *Science*, Vol. 290, 10, pp. 1140-1142 (2000), it is reported that with respect to polycondensation at room temperature by using hafnium chloride as the catalyst, polycondensation using a special aromatic diol monomer was performed successfully but the reaction of a general-purpose aromatic dicarboxylic acid monomer and an aromatic diol monomer did not proceed.

Such a failure in the synthesis of a non-crystalline polyester by low-temperature polycondensation is considered to result because monomers constituting a non-crystalline polyester have low reactivity and a reaction thereof does not satisfactorily proceed under the above-described low energy condition.

SUMMARY OF THE INVENTION

The present invention provides a binder resin for an electrostatic image developing toner, which can be obtained directly by polycondensation at a low temperature. The present invention also provides an electrostatic image developing toner excellent in the pulverization property and powder flowability and assured of high image quality, by applying the binder resin for an electrostatic image developing toner of the present invention to a production process of an electrostatic image developing toner, including a pulverization method and an aggregation-coalescence method.

The present invention provides the techniques in the following <1> to <8>.

<1> A binder resin for a toner, obtained by the polycondensation reaction of a polycarboxylic acid and a polyol, wherein from 50 to 100 mol % of the polycarboxylic acid comprises a compound represented by formula (1) and/or formula (2), from 50 to 100 mol % of the polyol comprises a compound represented by formula (3), and the content of a catalyst-originated metal element in the resin is 100 ppm or less:

$$R^1OOCA^1_mB^1_nA^1_lCOOR^{1'} \quad (1)$$

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$);

$$R^2OOCA^2_pB^2_qA^2_rCOOR^{2'} \quad (2)$$

(wherein $A^2$ is a methylene group, $B^2$ is an alicyclic hydrocarbon group, $R^2$ and $R^{2'}$ each is a hydrogen atom or a monovalent hydrocarbon group, $0 \leq p \leq 6$, $0 \leq r \leq 6$, and $1 \leq q \leq 3$);

$$HOX_hY_jX_kOH \quad (3)$$

(wherein X is an alkylene oxide group, Y is a bisphenol structure group, $1 \leq h+k \leq 10$, and $1 \leq j \leq 3$).

<2> A process for producing a binder resin for an electrostatic image developing toner, which is a process for producing the binder resin for an electrostatic image developing toner described in <1>, comprising a step of polycondensing a polycarboxylic acid and a polyol, wherein from 50 to 100 mol % of the polycarboxylic acid comprises a compound represented by formula (1) and/or formula (2), from 50 to 100 mol % of the polyol comprises a compound represented by formula (3), and the content of a catalyst-originated metal element in the resin is 100 ppm or less:

$$R^1OOCA^1_mB^1_nA^1_lCOOR^{1'} \quad (1)$$

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$);

$$R^2OOCA^2_pB^2_qA^2_rCOOR^{2'} \quad (2)$$

(wherein $A_2$ is a methylene group, $B^2$ is an alicyclic hydrocarbon group, $R^2$ and $R^{2'}$ each is a hydrogen atom or a monovalent hydrocarbon group, $0 \leq p \leq 6$, $0 \leq r \leq 6$, and $1 \leq q \leq 3$);

$$HOX_hY_jX_kOH \quad (3)$$

(wherein X is an alkylene oxide group, Y is a bisphenol structure group, $1 \leq h+k \leq 10$, and $1 \leq j \leq 3$).

<3> A binder resin liquid dispersion for an electrostatic image developing toner, in which the binder resin for an electrostatic image developing toner described in <1> is dispersed.

<4> A process for producing an electrostatic image developing toner, comprising a step of aggregating a binder resin in a liquid dispersion containing at least a binder resin liquid dispersion to obtain aggregate particles, and a step of heating and thereby coalescing the aggregate particles, wherein the binder resin liquid dispersion is the binder resin liquid dispersion for an electrostatic image developing toner described in <3>.

<5> An electrostatic image developing toner produced by the production process described in <4>.

<6> An electrostatic image developing toner produced by kneading and pulverizing the binder resin for an electrostatic image developing toner described in <1>.

<7> An electrostatic image developer comprising the electrostatic image developing toner described in <5> or <6> and a carrier.

<8> An image forming method comprising a latent image-forming step of forming an electrostatic latent image on the surface of a latent image-holding member, a development step of developing the electrostatic latent image formed on the surface of the latent image-holding member with a toner or an electrostatic image developer to form a toner image, a step of transferring the toner image formed on the surface of the latent image-holding member to the surface of a transferee member, and a fixing step of heat-fixing the toner image transferred to the surface of the transferee member, wherein the toner is the electrostatic image developing toner described in <5> or <6> or the developer is the electrostatic image developer described in <7>.

DETAILED DESCRIPTION OF THE INVENTION

The binder resin for an electrostatic image developing toner (in the present invention, the "electrostatic image developing toner" is sometimes simply referred to as a "toner") of the present invention is a binder resin for a toner, obtained by the polycondensation reaction of a polycarboxylic acid and a polyol, wherein from 50 to 100 mol % of the polycarboxylic acid comprises a compound represented by formula (1) and/or formula (2), from 50 to 100 mol % of the polyol comprises a compound represented by formula (3), and the content of a catalyst-originated metal element in the resin is 100 ppm or less:

  (1)

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$);

  (2)

(wherein $A^2$ is a methylene group, $B^2$ is an alicyclic hydrocarbon group, $R^2$ and $R^{2'}$ each is a hydrogen atom or a monovalent hydrocarbon group, $0 \leq p \leq 6$, $0 \leq r \leq 6$, and $1 \leq q \leq 3$);

  (3)

(wherein X is an alkylene oxide group, Y is a bisphenol structure group, $1 \leq h+k \leq 10$, and $1 \leq j \leq 3$).

A conventional polyester resin is generally polymerized at a high temperature of 200° C. or more in the presence of a metal catalyst such as tin and titanium. On the other hand, in the case of using a polyester as the resin for a toner, chargeability, more specifically, uniform chargeability with less difference in the charged amount among particles, is demanded. However, the metal contained in the metal catalyst generally has positive chargeability and the polyester has negative chargeability, as a result, there may arise repulsion or the like among toner particles due to the non-uniform presence of a residual metal catalyst. Generally, in the case of a two-component developer, electrification of a toner is controlled by a carrier, but the above-described slight repulsive force of a toner separated from a carrier in the development step, transfer step or the like cannot be controlled and this appears in the form of, for example, roughness in the edge part of a fine line.

In the present invention, the amount of this metal is controlled, whereby roughness in the edge part of a fine line, which has been heretofore difficult to control, is controlled and at the same time, a polyester reduced in the energy amount consumed for the production as compared with a conventional polyester is obtained.

The amount of a catalyst-originated metal element is 100 ppm or less, preferably 75 ppm or less, more preferably 50 ppm or less, still more preferably 10 ppm or less. The amount of a catalyst-originated metal element can be determined by shaping the binder resin for a toner and measuring the shaped sample by a fluorescent X-ray analyzer.

In the present invention, the polyester resin obtained by polycondensation is preferably a non-crystalline polyester resin.

In the production of a polyester by polycondensation, a catalyst for polycondensation is generally used. This provides an effect of forming an intermediate between the catalyst and a monomer during reaction, thereby enhancing the reactivity and accelerating the ester synthesis reaction. However, since the catalytic activity or reaction efficiency decreases at a low temperature, polycondensation tends not to proceed satisfactorily and a polyester having a high molecular weight or polymerization degree is not obtained in many cases. This tendency is prominent particularly when a polycondensation component having a cyclic structure is used as the raw material of a non-crystalline polyester.

The non-crystalline polyester has high flowability by virtue of its high hardness at an ordinary temperature and also has properties very suitable for a toner in view of offset inhibition, low-temperature fixing property, image quality and the like. The crystalline polyester mainly comprising a linear polycondensation component has a sharp-melt property attributable to the crystallinity and has a great merit to the low-temperature fixing property, but is deficient in that the powder flowability or image strength is inferior.

As for the great difference in the reactivity between the cyclic polycondensation component constituting a non-crystalline polyester and the linear polycondensation component constituting a crystalline polyester, one of causes therefor is presumed to be the difference in the reactivity derived from the structures. The cyclic polycondensation component has a rigid structure suppressed in its rotary motion, and the molecular motion particularly at a low temperature is liable to be more restricted than the linear polycondensation component. In particular, a polycondensation component having an aromatic ring readily forms a resonating structure between the aromatic ring and a polycondensation reactive functional group and this is considered to cause resonance stabilization of a reaction intermediate and delocalization of an electron and sometimes inhibit the progress of polycondensation reaction.

The present inventors have made intensive studies on this mechanism, as a result, a polycondensation component for a non-crystalline polyester, which can be reacted even at a low temperature, has been designed and thereby the objects of the present invention have been attained.

In the present invention, the polycondensation reaction is performed by an esterification reaction (dehydration reaction) of a polycarboxylic acid and a polyol, or a transesterification reaction of a polycarboxylic acid polyalkyl ester and a polyol. The polycondensation reaction may be either reaction, but a polycondensation reaction using a polycarboxylic acid and a polyol and being associated with a dehydration reaction is preferred.

In the polycarboxylic acid for use in the present invention, a compound (dicarboxylic acid) represented by formula (1) and/or formula (2) occupies from 50 to 100 mol %. In the present invention, the term "carboxylic acid" means a carboxylic acid including its esterified product and acid anhydride.

  (1)

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$).

  (2)

(wherein $A^2$ is a methylene group, $B^2$ is an alicyclic hydrocarbon group, $R^2$ and $R^{2'}$ each is a hydrogen atom or a monovalent hydrocarbon group, $0 \leqq p \leqq 6$, $0 \leqq r \leqq 6$, and $1 \leqq q \leqq 3$).

The monovalent hydrocarbon group represents an alkyl group, an alkenyl group, an alkynyl group, an aryl group, a hydrocarbon group or a heterocyclic group, and these groups each may have an arbitrary substituent. $R^1$, $R^{1'}$, $R^2$ and $R^{2'}$ each is preferably a hydrogen atom or a lower alkyl group, more preferably a hydrogen atom, a methyl group or an ethyl group, and most preferably a hydrogen atom.

Also, the aromatic hydrocarbon group in formula (1) and the alicyclic hydrocarbon group in formula (2) each may be substituted.

<Dicarboxylic Acid Represented by Formula (1)>

The dicarboxylic acid represented by formula (1) has at least one aromatic hydrocarbon group $B^1$, but the structure thereof is not particularly limited. Examples of the aromatic hydrocarbon group $B^1$ include, but are not limited to, benzene, naphthalene, acenaphthylene, fluorene, anthracene, phenanthrene, tetracene, fluoracene, pyrene, benzofluorene, benzophenanthrene, chrysene, triphenylene, benzopyrene, perylene, anthrathrene, benzonaphthacene, benzochrysene, pentacene, pentaphene and coronene structures. The aromatic hydrocarbon group is preferably a benzene and/or naphthalene ring structure. In these structures, a substituent may be further added.

The number of aromatic hydrocarbon groups $B^1$ contained in the dicarboxylic acid represented by formula (1) is from 1 to 3. If the number of aromatic hydrocarbon groups contained is less than 1, the polyester produced is deprived of the non-crystallinity, whereas if it exceeds 3, not only synthesis of such a dicarboxylic acid is difficult, giving rise to reduction in the efficiency of cost or production, but also reactivity decreases due to increase in the melting point or viscosity of the dicarboxylic acid represented by formula (1) or due to large size or bulkiness of the dicarboxylic acid.

In the case where the dicarboxylic acid represented by formula (1) contains a plurality of aromatic hydrocarbon groups, the aromatic hydrocarbon groups may be directly bonded to each other, or another structure such as saturated aliphatic hydrocarbon group may intervene therebetween. Examples of the former include a biphenyl structure, and examples of the latter include a bisphenol A structure, a benzophenone structure and a diphenylethene structure, but the present invention is not limited thereto.

The aromatic hydrocarbon group $B^1$ is suitably a group having a structure in which the carbon number of the main structure is from C6 to C18. This carbon number of the main structure does not include the carbon number contained in the functional group bonded to the main structure. Examples of the structure include benzene, naphthalene, acenaphthylene, fluorene, anthracene, phenanthrene, tetracene, fluoracene, pyrene, benzofluorene, benzophenanthrene, chrysene, triphenylene and bisphenol A structures. Among these structures, preferred are benzene, naphthalene, anthracene and phenanthrene structures, and most preferred are benzene and naphthalene structures.

The carbon number of the main structure is preferably 6 or more, because the production of the monomer is easy. Also, the carbon number of the main structure is preferably 18 or less, because the molecular size of the monomer is appropriate and the reactivity does not decrease due to restricted molecular motion. Furthermore, the proportion of the reactive functional group in the monomer molecule is proper and advantageously, reduction in the reactivity does not occur.

The dicarboxylic acid represented by formula (1) contains at least one or more methylene group $A^1$. The methylene group may be either linear or branched and, for example, a methylene chain, a branched methylene chain or a substituted methylene chain may be used. In the case of a branched methylene chain, the branched part is not limited in its structure and may have an unsaturated bond or may further have a branched or cyclic structure or the like.

The number of methylene groups $A^1$ is, in terms of the total m+l in the molecule, at least from 1 to 12. The total m+l is preferably from 2 to 6, and it is more preferred that m and l are the same number. If m+l is 0, that is, the dicarboxylic acid represented by formula (1) does not contain a methylene group, an aromatic hydrocarbon is directly bonded to a carboxyl group at both ends and in this case, the reaction intermediate formed by the catalyst and the dicarboxylic acid represented by formula (1) is resonance-stabilized, and the reactivity decreases. Also, if m+l exceeds 12, the linear moiety becomes excessively large for the dicarboxylic acid represented by formula (1) and the polymer produced may have properties of a crystalline polymer or the glass transition temperature Tg may decrease.

The bonding site of the methylene group $A^1$ or carboxyl group to the aromatic hydrocarbon group $B^1$ is not particularly limited and may be o-position, m-position or p-position.

Examples of the dicarboxylic acid represented by formula (1) include, but are not limited to, 1,4-phenylenediacetic acid, 1,4-phenylenedipropionic acid, 1,3-phenylenediacetic acid, 1,3-phenylenedipropionic acid, 1,2-phenylenediacetic acid and 1,2-phenylenedipropionic acid. Among these, 1,4-phenylenedipropionic acid, 1,3-phenylenedipropionic acid, 1,4-phenylenediacetic acid and 1,3-phenylenediacetic acid are suitable, and 1,4-phenylenediacetic acid and 1,3-phenylenediacetic acid are more suitable for a toner.

In the dicarboxylic acid represented by formula (1), various functional groups may be added to any site of the structure. Also, the carboxylic acid group as the polycondensation reactive functional group may be an acid anhydride, an acid esterified product or an acid chloride. However, an intermediate between an acid esterified product and a proton is readily stabilized and tends to inhibit the reactivity and therefore, a carboxylic acid, a carboxylic acid anhydride or a carboxylic acid chloride is suitably used.

<Dicarboxylic Acid Represented by Formula (2)>

The dicarboxylic acid represented by formula (2) contains an alicyclic hydrocarbon group $B^2$. The alicyclic hydrocarbon structure is not particularly limited and examples thereof include, but are not limited to, cyclopropane, cyclobutane, cyclopentane, cyclohexane, cycloheptane, cyclooctane, cyclononane, cyclodecane, cycloundecane, cyclododecane, cyclopropene, cyclobutene, cyclopentene, cyclohexene, cycloheptene, cyclooctene, norbornene, adamantane, diamantane, triamantane, tetramantane, iceane, twistane and norbornene structures. In these substances, a substituent may be added. Considering the stability of the structure or the size or bulkiness of the molecule, cyclobutane, cyclopentane, cyclohexane, norbornene and adamantane are preferred.

The number of the alicyclic hydrocarbon groups contained in this monomer is at least from 1 to 3. If the number of the alicyclic hydrocarbon groups contained is less than 1, the produced polyester is deprived of non-crystallinity, whereas if it exceeds 3, the reactivity decreases due to increase in the melting point of the dicarboxylic acid represented by formula (2) or due to large size or bulkiness of the molecule.

In the case of containing a plurality of alicyclic hydrocarbon groups, the dicarboxylic acid may take either a structure where the aromatic hydrocarbon groups are directly bonded to each other, or a structure where another structure such as saturated aliphatic hydrocarbon group intervenes therebetween. Examples of the former include a dicyclohexyl structure, and examples of the latter include a hydrogenated bisphenol A structure, but the present invention is not limited thereto.

The alicyclic hydrocarbon group is suitably a substance having a carbon number of C3 to C12. This carbon number of the main structure does not include the carbon number contained in the functional group bonded to the main structure. Examples of the substance include a substance having a cyclopropane, cyclobutane, cyclopentane, cyclohexane, cyclonaphthalene, acenaphthylene, fluorene, anthracene, phenanthrene, tetracene, fluoracene, pyrene, benzofluorene, benzophenanthrene, chrysene or triphenylene structure. Among these structures, preferred are cyclobutane, cyclopentane, cyclohexane, norbornene and adamantane. The alicyclic hydrocarbon group preferably contains at least one structure selected from the group consisting of cyclobutane, cyclohexane and cyclohexene structures.

The dicarboxylic acid represented by formula (2) may contain a methylene group $A^2$ in its structure. The methylene group may be either linear or branched and, for example, a methylene chain, a branched methylene chain or a substituted methylene chain may be used. In the case of a branched methylene chain, the branched part is not limited in its structure and may have an unsaturated bond or may further have a branched or cyclic structure or the like.

As for the number of methylene groups $A^2$, p and r each is 6 or less. If either one or both of p and r exceeds 6, the linear moiety becomes excessively large for the dicarboxylic acid represented by formula (2) and the polymer produced may have properties of a crystalline polymer or the glass transition temperature Tg may decrease.

The bonding site of the methylene group $A^2$ or carboxyl group to the alicyclic hydrocarbon group $B^2$ is not particularly limited and may be o-position, m-position or p-position.

Examples of the dicarboxylic acid represented by formula (2) include, but are not limited to, 1,1-cyclo-propanedicarboxylic acid, 1,1-cyclobutanedicarboxylic acid, 1,2-cyclobutanedicarboxylic acid, 1,1-cyclopentenedicarboxylic acid, 1,4-cyclohexanedicarboxylic acid, 1,3-cyclohexanedicarboxylic acid, 1,2-cyclohexanedicarboxylic acid, 1,2-cyclohexenedicarboxylic acid, norbornene-2,3-dicarboxylic acid and adamantanedicarboxylic acid: Among these, preferred are substances having a cyclobutane, cyclohexane or cyclohexane structure, more preferred are 1,3-cyclohexanedicarboxylic acid and 1,4-cyclohexanedicarboxylic acid.

In the dicarboxylic acid represented by formula (2), various functional groups may be added to any site of the structure. Also, the carboxylic acid group as the polycondensation reactive functional group may be an acid anhydride, an acid esterified product or an acid chloride. However, an intermediate between an acid esterified product and a proton is readily stabilized and tends to inhibit the reactivity and therefore, a carboxylic acid, a carboxylic acid anhydride or a carboxylic acid chloride is suitably used.

In the present invention, the compound (dicarboxylic acid) represented by formula (1) and/or formula (2) is contained in an amount of 50 to 100 mol % based on the entire polycarboxylic acid component. The compound represented by formula (1) or the compound represented by formula (2) may be used alone or these compounds may be used in combination.

If the proportion of the compound represented by formula (1) and/or formula (2) is less than 50 mol %, the reactivity in low-temperature polycondensation cannot be fully brought out and the molecular weight is not extended, as a result, a polyester having a low polymerization degree may be produced or a large number of residual polycondensation components may be mixed, giving rise to worsening of powder flowability such as occurrence of sticking of the binder resin at an ordinary temperature, or failure in obtaining a viscoelasticity or glass transition temperature fitted to a binder for a toner. The compound represented by formula (1) and/or formula (2) is preferably contained in a proportion of 60 to 100 mol %, more preferably from 80 to 100 mol %.

<Diol Represented by Formula (3)>

The binder resin for an electrostatic image developing toner of the present invention is a binder resin for a toner, obtained by the polycondensation reaction of a polycarboxylic acid and a polyol, wherein from 50 to 100 mol % of the polyol comprises a compound (diol) represented by formula (3):

$$HOX_hY_jX_kOH \qquad (3)$$

(wherein X is an alkylene oxide group, Y is a bisphenol structure group, $1 \leq h+k \leq 10$, and $1 \leq j \leq 3$).

The diol represented by formula (3) contains at least one bisphenol structure Y.

The bisphenol structure is not particularly limited as long as it is a structure constituted by two phenol groups, and examples thereof include, but are not limited to, bisphenol A, bisphenol C, bisphenol E, bisphenol F, bisphenol M, bisphenol P, bisphenol S and bisphenol Z. Among these structures, preferred are bisphenol A, bisphenol C, bisphenol E, bisphenol F, bisphenol M, bisphenol P, bisphenol S and bisphenol Z, more preferred are bisphenol A, bisphenol E and bisphenol F.

The number j of bisphenol structures is from 1 to 3. If the diol represented by formula (3) does not have a bisphenol structure, the produced polyester may have properties of a crystalline polyester and this defeats the purpose. If the number of bisphenol structures contained exceeds 3, not only such a diol is difficult to produce and impractical in view of efficiency or cost but also the molecule becomes large and bulky to cause increase in the viscosity or melting point and in turn decrease in the reactivity.

In the present invention, the diol represented by formula (3) contains at least one alkylene oxide group. Examples of the alkylene oxide group include, but are not limited to, an ethylene oxide group, a propylene oxide group and a butylene oxide group. Among these, ethylene oxide and propylene oxide are preferred, and ethylene oxide is more preferred.

The number h+k of alkylene oxide groups in one molecule is from 1 to 10. If the number of ethylene oxide groups is less than 1, that is, an ethylene oxide group is not added, an electron is delocalized due to resonance stabilization between a hydroxyl group and an aromatic ring in the bisphenol structure and the nucleophilic attack on the polycarboxylic acid by the diol represented by formula (3) is weakened, as a result, extension of the molecular weight and progress of the polymerization degree are suppressed. On the other hand, if the number of alkylene oxide groups added exceeds 10, not only the linear moiety in the diol represented by formula (3) becomes excessively long and the polyester produced comes to have properties of a crystalline polyester, but also the number of reactive functional groups in the diol represented by formula (3) decreases and the reaction probability lowers.

From the standpoint of accelerating a uniform reaction, h and k are preferably the same number. Also, the number h+k of alkylene oxide groups is preferably 6 or less, and it is more preferred that the numbers h and k of alkylene oxide groups each is 2 or 1. In the case of containing two or more alkylene oxide groups, two or more kinds of alkylene oxide groups may be contained in one molecule.

As for the diol represented by formula (3), examples of the bisphenol A ethylene oxide adduct (h+k is from 1 to 10) include, but are not limited to, a bisphenol A propylene oxide adduct (h+k is from 1 to 10), an ethylene oxide propylene oxide adduct (h+k is from 2 to 10), a bisphenol Z ethylene oxide adduct (h+k is from 1 to 10), a bisphenol Z propylene oxide adduct (h+k is from 1 to 10), a bisphenol S ethylene oxide adduct (h+k is from 1 to 10), a bisphenol S propylene oxide adduct (h+k is from 1 to 10), a bisphenol propylene oxide adduct (h+k is from 1 to 10), a bisphenol F ethylene oxide adduct (h+k is from 1 to 10), a bisphenol F propylene oxide adduct (h+k is from 1 to 10), a bisphenol E ethylene oxide adduct (h+k is from 1 to 10), a bisphenol E propylene oxide adduct (h+k is from 1 to 10), a bisphenol C ethylene oxide adduct (h+k is from 1 to 10), a bisphenol C propylene oxide adduct (h+k is from 1 to 10), a bisphenol M ethylene oxide adduct (h+k is from 1 to 10), a bisphenol M propylene oxide adduct (h+k is from 1 to 10), a bisphenol P ethylene oxide adduct (h+k is from 1 to 10) and a bisphenol P propylene oxide adduct (h+k is from 1 to 10). Among these, preferred are a 1-mol ethylene oxide adduct of bisphenol A (h and k each is 1), a 2-mol ethylene oxide adduct of bisphenol A (h and k each is 2), a 1-mol propylene oxide adduct of bisphenol A (h and k each is 1), a 1-mol ethylene oxide 2-mol propylene oxide adduct of bisphenol A, a 1-mol ethylene oxide adduct of bisphenol E (h and k each is 1), a 1-mol propylene oxide adduct of bisphenol E (h and k each is 1), a 1-mol ethylene oxide adduct of bisphenol F (h and k each is 1) and a 1-mol propylene oxide adduct of bisphenol F (h and k each is 1).

In the present invention, the diol represented by formula (3) is contained in the polyol in a proportion of 50 to 100 mol %. If the content is 50 mol % or less, the reactivity in low-temperature polycondensation cannot be fully brought out and the molecular weight is not extended, as a result, a polyester having a low polymerization degree may be produced or a large number of residual polycondensation components may be mixed, giving rise to worsening of powder flowability such as occurrence of sticking of the binder resin at an ordinary temperature, or failure in obtaining a viscoelasticity or glass transition temperature fitted to a binder for a toner. The diol represented by formula (3) is preferably contained in a proportion of 60 to 100 mol %, more preferably from 80 to 100 mol %.

<Catalyst>

In the present invention, a catalyst is preferably used at the polycondensation reaction.

Particularly, a Broensted acid-based polycondensation catalyst is preferably used in the present invention. Examples of the Broensted acid-based catalyst include, but are not limited to, an alkylbenzenesulfonic acid such as dodecylbenzenesulfonic acid, isopropylbenzenesulfonic acid and comphorsulfonic acid, an alkylsulfonic acid, an alkyldisulfonic acid, an alkylphenolsulfonic acid, an alkylnaphthalenesulfonic acid, an alkyltetralinsulfonic acid, an alkylallylsulfonic acid, a petroleum sulfonic acid, an alkylbenzimidazolesulfonic acid, a higher alcohol ether sulfonic acid, an alkyldiphenylsulfonic acid, a higher fatty acid sulfuric acid ester such as monobutyl-phenylphenol sulfate, dibutyl-phenylphenol sulfate and dodecyl sulfate, a higher alcohol sulfuric acid ester, a higher alcohol ether sulfuric acid ester, a higher fatty acid amide alkylol sulfuric acid ester, a higher fatty acid amide alkylated sulfuric acid ester, a naphthenyl alcohol sulfuric acid, a sulfated fat, a sulfosuccinic acid ester, various fatty acids, a sulfonated higher fatty acid, a higher alkylphosphoric acid ester, a resin acid, a resin acid alcohol sulfuric acid, a naphthenic acid, a niobic acid, and salt compounds of all of these acids. Such a catalyst may have a functional group in the structure. A plurality of these catalysts may be used in combination, if desired. Among these Broensted acid-based catalysts, preferred are a dodecylbenzenesulfonic acid, a benzenesulfonic acid, a p-toluenesulfonic acid and a comphorsulfonic acid.

Another polycondensation catalyst commonly used may also be used in combination with the above-described catalyst or by itself. Specific examples thereof include a metal catalyst, a hydrolase-type catalyst and a basic catalyst.

Examples of the metal catalyst include, but are not limited to, an organic tin compound, an organic titanium compound, an organic tin halide compound and a rare earth metal catalyst.

As for the rare earth-containing catalyst, specifically, those containing an element such as scandium (Sc), yttrium (Y), lanthanum (La) as lanthanoid element, cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu) are effective. In particular, those having an alkylbenzenesulfonate, alkylsulfuric acid ester salt or triflate structure are effective. As for the triflate, examples of the structural formula include $X(OSO_2CF_3)_3$. X is a rare earth element and preferably scandium (Sc), yttrium (Y), ytterbium (Yb) or samarium (Sm).

The lanthanoid triflate is described in detail in *Journal of Synthetic Organic Chemistry, Japan*, Vol. 53, No. 5, pp. 44-54.

In the case of using a metal catalyst as the catalyst, the content of the catalyst-originated metal in the obtained resin is made to be 100 ppm or less, preferably 75 ppm or less, more preferably 50 ppm or less. Accordingly, a metal catalyst is preferably not used or even if used, the metal catalyst is preferably used in a very slight amount.

The hydrolase-type catalyst is not particularly limited as long as it catalyzes an ester synthesis reaction. Examples of the hydrolase for use in the present invention include an esterase classified into EC (enzyme code) group 3.1 (see, for example, Maruo and Tamiya (supervisors), *Koso Handbook* (*Handbook of Enzyme*), Asakura Shoten (1982)) such as carboxyesterase, lipase, phospholipase, acetylesterase, pectinesterase, cholesterol esterase, tannase, monoacylglycerol lipase, lactonase and lipoprotein lipase; a hydrolase classified into EC group 3.2 having activity on a glycosyl compound, such as glucosidase, galactosidase, glucuronidase and xylosidase; a hydrolase classified into EC group 3.3 such as epoxide hydrase; a hydrolase classified into EC group 3.4 having activity on a peptide bond, such as aminopeptidase, chymotrypsin, trypsin, plasmin and subtilisin; and a hydrolase classified into EC group 3.7 such as phloretin hydrase.

Among those esterases, an enzyme of hydrolyzing a glycerol ester and isolating a fatty acid is called a lipase. The lipase is advantageous in that, for example, this enzyme shows high stability in an organic solvent, catalyzes an ester synthesis reaction with good efficiency and is inexpensive. Accordingly, from the aspect of yield and cost, a lipase is preferably used also in the present invention.

Lipases of various origins may be used but preferred examples thereof include a lipase obtained from microorganisms of *Pseudomonas* group, *Alcaligenes* group, *Achromobacter* group, *Candida* group, *Aspergillus* group, *Rizopus* group and *Mucor* group, a lipase obtained from plant seeds and a lipase obtained from animal tissues, and further include pancreatin and steapsin. Among these, preferred is a lipase originated in microorganisms of *Pseudomonas* group, *Candida* group and *Aspergillus* group.

Examples of the basic catalyst include, but are not limited to a general organic base compound, a nitrogen-containing basic compound, and a tetraalkylphosphonium or tetraarylphosphonium hydroxide such as tetrabutylphosphonium hydroxide. Examples of the organic base compound include ammonium hydroxides such as tetramethylammonium hydroxide and tetraethylammonium hydroxide. Examples of the nitrogen-containing basic compound include amines (e.g., triethylamine, dibenzylmethylamine), pyridine, methylpyridine, methoxypyridine, quinoline, imidazole, a hydroxide, hydride or amide of alkali metals (e.g., sodium, potassium, lithium cesium) or alkaline earth metals (e.g., magnesium, barium), and a salt of an alkali or alkaline earth metal with an acid, such as carbonate, phosphate, borate and carboxylate, or with a phenolic hydroxyl group.

Other examples include a compound with an alcoholic hydroxyl group, and a chelate compound with acetylacetone, but the present invention is not limited thereto.

As for the total amount added of the catalyst, one species or a plurality of species may be added in a proportion of 0.1 to 10,000 ppm based on the polycondensation components.

In the present invention, the binder resin can be obtained even by performing the polycondensation reaction at a temperature lower than the conventional reaction temperature. The reaction temperature is preferably from 70 to 150° C., more preferably from 80 to 140° C.

The reaction temperature is preferably 70° C. or more, because the reactivity does not decrease due to reduction in the solubility of monomer or in the catalytic activity and the extension of the molecular weight is not inhibited. Also, the reaction temperature is preferably 150° C. or less, because production with a low energy can be implemented and furthermore, coloration of the resin or decomposition or the like of the produced polyester does not occur.

The polycondensation reaction may be performed by a general polycondensation process such as bulk polymerization, emulsion polymerization, submerged polymerization (e.g., suspension polymerization), solution polymerization and interface polymerization, but bulk polymerization is preferred. Also, the reaction may be performed under atmospheric pressure, but when the purpose is to increase the molecular weight of the obtained polyester molecule, general conditions such as reduced pressure or nitrogen stream can be employed.

In view of fixing property and image forming property, the binder resin for a toner of the present invention preferably has a glass transition temperature of 30 to 75° C. The glass transition temperature is preferably 30° C. or more, because flowability of the toner powder at an ordinary temperature and the cohesive force of the binder resin itself in a high-temperature region are good and hot offset does not occur. Also, the glass transition temperature is preferably 75° C. or less, because satisfactory melting and a good minimum fixing temperature are obtained.

The glass transition temperature is more preferably from 35 to 70° C., still more preferably from 45 to 65° C. The glass transition temperature can be controlled, for example, by the molecular weight or monomer constitution of the binder resin or by the addition of a crosslinking agent.

The glass transition point can be measured by a method prescribed in ASTM D3418-82 and is measured by means of a differential scanning calorimeter (DSC).

In order to have suitability for a toner, the non-crystalline binder resin produced in the present invention preferably has a weight average molecular weight of 5,000 to 50,000, more preferably from 7,000 to 35,000. The weight average molecular weight is preferably 5,000 or more, because not only the powder flowability at an ordinary temperature is good and the toner is free from blocking but also the cohesive force as a toner binder resin is high and reduction in the hot offset property is not caused. Also, the weight average molecular is preferably 50,000 or less, because good hot offset property and good minimum fixing temperature are obtained and the time period or temperature necessary for the polycondensation is proper to ensure high production efficiency.

The weight average molecular weight can be measured, for example, by gel permeation chromatography (GPC).

The non-crystalline polyester of the present invention may be polycondensed together with a polycondensation component other than those described above as long as its properties are not impaired.

As for the polycarboxylic acid, a polyvalent carboxylic acid containing two or more carboxyl groups within one molecule may be used. Out of these carboxylic acids, a dicarboxylic acid is a compound containing two carboxyl groups within one molecule and examples thereof include an oxalic acid, a succinic acid, an itaconic acid, a glutaconic acid, a glutaric acid, a maleic acid, an adipic acid, a β-methyladipic acid, a suberic acid, an azelaic acid, a sebacic acid, a nonanedicarboxylic acid, a decanedicarboxylic acid, an undecanedicarboxylic acid, a dodecanedicarboxylic acid, a fumaric acid, a citraconic acid, a diglycolic acid, a malic acid, a citric acid, a hexahydroterephthalic acid, a malonic acid, a pimelic acid, a tartaric acid, a mucic acid, a phthalic acid, an isophthalic acid, a terephthalic acid, a tetrachlorophthalic acid, a chlorophthalic acid, a nitrophthalic acid, a biphenyl-p,p'-dicarboxylic acid, a naphthalene-1,4-dicarboxylic acid, a naphthalene-1,5-dicarboxylic acid, a naphthalene-2,6-dicarboxylic acid, an anthracene dicarboxylic acid, an n-dodecylsuccinic acid, an n-dodecenylsuccinic acid, an isododecylsuccinic acid, an isododecenylsuccinic acid, an n-octylsuccinic acid and an n-octenylsuccinic acid. Examples of the polyvalent carboxylic acid other than the dicarboxylic acid include a trimellitic acid, a pyromellitic acid, a naphthalenetricarboxylic acid, a naphthalenetetracarboxylic acid, a pyrenetricarboxylic acid and a pyrenetetracarboxylic acid.

Other examples include an acid anhydride, an acid chloride and an acid esterified product of these carboxylic acids, but the present invention is not limited thereto.

As for the polyol (polyhydric alcohol), a polyol containing two or more hydroxyl groups within one molecule may be used. Out of these polyols, the divalent polyol (diol) is a compound having two hydroxyl groups within one molecule and examples thereof include ethylene glycol, diethylene glycol, triethylene glycol, propylene glycol, butanediol, butenediol, neopentyl glycol, pentane glycol, hexanediol, cyclohexanediol, cyclohexanedimethanol, octanediol, nonanediol, decanediol, dodecanediol, dipropylene glycol, polyethylene glycol, polypropylene glycol, polytetramethylene glycol, bisphenols except for bisphenols described above, and hydrogenated bisphenols. Examples of the polyol other than the divalent polyol include glycerin, pentaerythritol, hexamethylolmelamine, hexaethylolmelamine, tetramethylolbenzoguanamine and tetraethylolbenzoguanamine.

The content of such a monomer is less than 50 mol %, preferably 40 mol % or less, more preferably 20 mol % or less, of the polycarboxylic acid or polyalcohol as a polycondensation component.

In the present invention, the polycondensation step may contain a polymerization reaction of the above-described polycarboxylic acid and polyol as polycondensation components with a prepolymer which has been previously prepared. The prepolymer is not limited as long as it is a polymer capable of being dissolved or uniformly mixed in those monomers.

Furthermore, the binder resin of the present invention may contain, for example, a homopolymer of the above-described polycondensation component, a copolymer comprising a combination of two or more monomers containing the above-described polycondensation component, or a mixture, graft polymer, partial branching or crosslinked structure thereof.

Using the binder resin for a toner produced by the present invention, a toner may be produced by a mechanical production process such as melt-kneading pulverization method, or a so-called chemical production process of preparing a binder resin liquid dispersion (in the present invention, sometimes also referred to as a "binder resin particle liquid dispersion" or a "resin particle liquid dispersion") from the polyester and producing a toner from the binder resin liquid dispersion.

When a toner is produced by using the binder resin of the present invention according to a mechanical production process such as melt-kneading method, good dispersibility or pulverization property of a pigment or the like is attained. This is considered to result because a polycondensation component exhibiting high reactivity at a low temperature is contained as the main component and the polycondensation can be performed at a temperature lower than that of a conventional polycondensation reaction, so that production of a by-product or unreacted product can be prevented and a binder resin uniform in the physical properties can be obtained.

In the case of producing a toner by a melt-kneading pulverization method, the polyester resin produced as above is preferably stirred and mixed with other toner raw materials in a Henschel mixer, a super mixer or the like in advance of the melt kneading. At this time, the capacity of stirrer, the rotation speed of stirrer, the stirring time and the like must be selected in combination.

The stirred product of the binder resin for a toner and other toner raw materials is then kneaded in the melted state by a known method. Kneading by a single-screw or multiple-screw extruder is preferred because the dispersibility is enhanced. At this time, the kneading must be controlled by setting all of the number of kneading screw zones, the cylinder temperature, the kneading speed and the like of the kneading apparatus to appropriate values. Out of the controlling factors at the kneading, the rotation number of kneader, the number of kneading screw zones and the cylinder temperature have particularly great effect on the kneaded state. In general, the rotation number is preferably from 300 to 1,000 rpm and as for the number of kneading screw zones, kneading is more successfully performed by using a multi-stage zone such as two-stage screw, rather than a one-stage zone. The cylinder preset temperature is preferably determined by the softening point of the non-crystalline polyester working out to the main component of the binder resin and usually, this temperature is preferably set to approximately from −20 to +100° C. of the softening temperature. A cylinder preset temperature in this range is preferred, because satisfactory kneading-dispersion is obtained and aggregation does not occur and furthermore, because kneading shear is applied to ensure sufficient dispersion and at the same time, cooling after kneading is facilitated.

The kneaded product after melt-kneading is thoroughly cooled and then pulverized by a known method such as mechanical pulverization method (e.g., ball mill, sand mill, hammer mill) or airflow pulverization method. In the case where satisfactory cooling cannot be performed by a normal method, a cooling or freeze pulverization method may also be selected.

For the purpose of controlling the particle size distribution of the toner, the toner after pulverization is sometimes classified. Classification to remove particles having an improper diameter provides an effect of enhancing the fixing property of toner or the image quality.

On the other hand, to cope with recent demands for high image quality, many chemical production methods of a toner are employed as a technique for realizing a low-energy production process of a toner with a small diameter. As for the chemical production process of a toner using the binder resin for a toner of the present invention, a general-purpose production process may be used but an aggregation-coalescence method is preferred. The aggregation-coalescence method is a known aggregation method of producing a latex by dispersing a binder resin in water and aggregating (associating) it together with other toner raw materials.

The method of dispersing the binder resin produced as above in water is not particularly limited and may be selected from known methods such as forced emulsification method, self-emulsification method and phase-inversion emulsification method. Among these, a self-emulsification method and a phase inversion emulsification method are preferred in view of the energy required for emulsification, the controllability of the particle diameter of emulsified product, the safety and the like.

The self-emulsification method and phase inversion emulsification method are described in *Chobiryushi Polymer no Oyo Gijutsu (Applied Technology of Ultrafine Particulate Polymer)*, CMC. As for the polar group used in the self-emulsification method, a carboxyl group, a sulfone group or the like may be used, but when the self-emulsification is applied to the non-crystalline polyester binder resin for a toner of the present invention, a carboxyl group is preferred.

Using the thus-produced binder resin liquid dispersion, so-called latex, a toner controlled in the toner particle diameter and distribution can be produced by an aggregation (association) method. More specifically, a latex produced as above is mixed with a colorant particle liquid dispersion and a releasing agent particle liquid dispersion, a coagulant is added to generate hetero-aggregation and thereby form an aggregate particle having a toner size, and the aggregate particles are fused and coalesced under heating to a temperature higher than the glass transition point or melting point of the binder resin particle, then washed and dried to obtain a toner. In this production process, the toner shape from amorphous to spherical can be controlled by selecting the heating temperature condition.

After the completion of the fusion coalescence step of aggregate particles, a washing step, a solid-liquid separation step and a drying step are arbitrarily performed to obtain a desired toner particle. When chargeability is taken account of, the washing step is preferably performed by thorough displacement and washing with ion exchanged water. The solid-liquid separation step is not particularly limited but in view of productivity, suction filtration, pressure filtration and the like are preferred. The drying step is also not particularly limited but in view of productivity, freeze drying, flash jet drying, fluidized drying and vibration-type fluidized drying are preferred.

As for the coagulant, a surfactant, an inorganic salt or a divalent or higher polyvalent metal salt may be suitably used. In particular, a metal salt is preferred in view of aggregation control and properties such as toner chargeability. The metal salt compound used for the aggregation is obtained by dissolving a general inorganic metal compound or a polymer thereof in the resin particle liquid dispersion, and the metal element constituting the inorganic metal salt is preferably a metal element having a divalent or higher electric charge and belonging to Groups 2A, 3A, 4A, 5A, 6A, 7A, 8, 1B, 2B and 3B of the Periodic Table (long Periodic Table) and may be sufficient if it dissolves in the form of ion in an aggregation system of resin particles. Specific preferred examples of the inorganic metal salt include a metal salt such as calcium chloride, calcium nitrate, barium chloride, magnesium chloride, zinc chloride, aluminum chloride and aluminum sulfate, and an inorganic metal salt polymer such as polyaluminum chloride, polyaluminum hydroxide and polycalcium sulfide. Among these, an aluminum salt and a polymer thereof are preferred. Generally, in order to obtain a sharper particle size distribution, the valence number of the inorganic metal salt is preferably divalence rather than monovalence and preferably trivalence or higher valence rather than divalence. When the valence is the same, a polymerization-type inorganic metal salt polymer is more preferred.

In the present invention, if desired, one or a plurality in combination of known additives may be blended within the range of not affecting the effects of the present invention. Examples of the additive include a flame retardant, a flame retardant aid, a brightener, a waterproof agent, a water repellent, an inorganic filler (surface modifier), a releasing agent, an antioxidant, a plasticizer, a surfactant, a dispersant, a lubricant, a filler, an extender pigment, a binder and a charge-control agent. These additives may be blended at any stage in the production of an electrostatic image developing toner.

As for the internal additive, various charge control agents commonly used, such as quaternary ammonium salt compound and nigrosine-based compound, may be used as the charge control agent but in view of stability at the production and less contamination by waste water, a material hardly soluble in water is preferred.

Examples of the releasing agent which can be used include low molecular weight polyolefins such as polyethylene, polypropylene and polybutene; silicones having a softening point at which softening occurs under heat; fatty acid amides such as oleic acid amide, erucic acid amide, ricinoleic acid amide and stearic acid amide; an ester wax; a vegetable wax such as carnauba wax, rice wax, candelilla wax, Japan wax and jojoba oil; an animal wax such as bees wax; a mineral or petroleum wax such as montan wax, ozokerite, ceresin, paraffin wax, microcrystalline wax, microcrystalline wax and Fischer-Tropsch wax; and a modified product thereof.

Such a wax is dispersed in water together with an ionic surfactant and a polymer electrolyte such as polymer acid or polymer base, and pulverized under heating to a temperature higher than the melting point in a homogenizer or pressure jet-type disperser capable of applying strong shear, whereby a liquid dispersion of particles of 1 µm or less can be produced.

Examples of the flame retardant and flame retardant aid include, but are not limited to, a bromine-based flame retardant already used in general, antimony trioxide, magnesium hydroxide, aluminum hydroxide and ammonium polyphosphate.

As for the coloring component (colorant), any known pigment or dye may be used. Specific examples thereof include a carbon black such as furnace black, channel black, acetylene black and thermal black; an inorganic pigment such as red iron oxide, iron blue and titanium oxide; an azo pigment such as Fast Yellow, Disazo Yellow, pyrazolone red, chelate red, Brilliant Carmine and Para Brown; a phthalocyanine pigment such as copper phthalocyanine and nonmetal phthalocyanine; a condensation polycyclic pigment such as flavanthrone yellow, dibromoanthrone orange, perylene red, Quinacridone Red and Dioxazine Violet; and various pigments such as chrome yellow, Hansa Yellow, Benzidine Yellow, Indanthrene Yellow, Quinoline Yellow, Permanent Orange GTR, Pyrazolone Orange, Vulcan Orange, Watchung Red, Permanent Red, DuPont Oil Red, Lithol Red, Rhodamine B Lake, Lake Red C, Rose Bengal, Aniline Blue, Ultramarine Blue, Carco Oil Blue, Methylene Blue Chloride, Phthalocyanine Blue, Phthalocyanine Green, Malachite Green Oxalate, C.I. Pigment-Red 48:1, C.I. Pigment-Red 122, C.I. Pigment-Red 57:1, C.I. Pigment-Yellow 12, C.I. Pigment-Yellow 97, C.I. Pigment-Yellow 17, C.I. Pigment-Blue 15:1 and C.I. Pigment-Blue 15:3. One of these pigments may be used or two or more thereof may be used in combination.

Similarly to the normal toner, an inorganic particle such as silica, alumina, titania and calcium carbonate, or a resin particle such as vinyl-based resin, polyester and silicone, may be used as a flowability aid or a cleaning aid by adding (externally adding) it in the dry state under shearing to the surface of the toner after drying.

Examples of the surfactant used in the process of the present invention include an anionic surfactant such as sulfuric ester salt type, sulfonate type, phosphoric ester type and soap type; and a cationic surfactant such as amine salt type and quaternary ammonium salt type. It is also effective to use a nonionic surfactant in combination, such as polyethylene glycol type, alkylphenol ethylene oxide adduct type and polyhydric alcohol type. As for the dispersing means, a generally employed device such as rotation shearing homogenizer and media-containing ball mill, sand mill or dynomill, may be used.

The toner of the present invention preferably has a volume average particle diameter ($D_{50}$) of 3.0 to 20.0 µm, more preferably from 3.0 to 9.0 µm. $D_{50}$ is preferably 3.0 µm or more, because an appropriate adhesive force is obtained and the developability does not decrease. Also, $D_{50}$ is preferably 9.0 µm or less, because sufficiently high image resolution is obtained. The volume average particle diameter ($D_{50}$) can be measured, for example, by a laser diffraction-type particle size distribution measuring device.

Furthermore, the toner of the present invention preferably has a volume average particle distribution GSDv of 1.4 or less. Particularly, in the case of a chemical process toner, GSDv is more preferably 1.3 or less.

When a cumulative distribution of each volume is drawn from the small diameter side with respect to the particle size range (channel) divided on the basis of particle size distribution, the particle diameter at 16% accumulation is defined as $D_{16v}$ and the particle diameter at 84% accumulation is defined as $D_{84v}$. Using these, the volume average particle distribution (GSDv) is calculated according to the following formula:

$$\text{Volume average particle distribution } GSDv = (D_{84v}/D_{16v})^{0.5}$$

When the GSDv is 1.4 or less, uniform particle diameter and good fixing property are obtained and the apparatus is advantageously free from a trouble ascribable to fixing failure. Also, scattering of the toner causing contamination in the apparatus or deterioration of the developer does not occur and this is preferred.

The volume average particle distribution GSDv can be measured, for example, by a laser diffraction-type particle size distribution measuring device.

In the case of producing the toner of the present invention by a chemical production process, from the standpoint of image forming property, the shape factor SF1 is preferably from 100 to 140, more preferably from 110 to 135. At this time, SF1 is calculated as follows.

$$SF1 = \frac{(ML)^2}{A} \times \frac{\pi}{4} \times 100$$

wherein ML represents an absolute maximum length of the particle and A represents a projected area of the particle.

These are quantified mainly by inputting a microscopic image or a scanning electron microscopic image into a Luzex image analyzer, and analyzing the image.

(Electrostatic Image Developer)

The electrostatic image developing toner of the present invention is used as an electrostatic image developer. This developer is not particularly limited as long as it contains the electrostatic image developing toner, and may take an appropriate component composition according to the purpose. When the electrostatic image developing toner is used alone, the developer is prepared as a one-component system electrostatic image developer, whereas when the toner is used in combination with a carrier, the developer is prepared as a two-component system electrostatic image developer.

The carrier is not particularly limited, but examples of the carrier usually employed include a magnetic particle such as iron powder, ferrite, iron oxide powder and nickel; a resin-coated carrier obtained by coating the surface of a magnetic particle as a core material with a resin such as styrene-based resin, vinyl-based resin, ethylene-based resin, rosin-based resin, polyester-based resin and melamine-based resin or with a wax such as stearic acid to form a resin coat layer; and a magnetic material dispersion-type carrier obtained by dispersing magnetic particles in a binder resin. Among these, a resin-coated carrier is preferred because the chargeability of the toner or the resistance of the entire carrier can be controlled by the constitution of the resin coat layer.

The mixing ratio between the toner of the present invention and the carrier in the two-component system electrostatic image developer is usually from 2 to 10 parts by weight of toner per 100 parts by weight of carrier. The preparation method of the developer is not particularly limited, but examples thereof include a method of mixing the toner and the carrier by a V blender.

(Image Forming Method)

The electrostatic image developing toner and electro-static image developer of the present invention may be used for an image forming method in a normal electrostatic image developing system (electrophotographic system).

The image forming method of the present invention is an image forming method comprising a latent image-forming step of forming an electrostatic latent image on the surface of a latent image-holding member, a development step of developing the electrostatic latent image formed on the surface of the latent image-holding member with a developer containing a toner to form a toner image, a transfer step of transferring the toner image formed on the surface of the latent image-holding member to the surface of a transferee member, and a fixing step of heat-fixing the toner image transferred to the surface of the transferee member, wherein the toner is the electrostatic image developing toner of the present invention, or the developer is the electrostatic image developer of the present invention.

The above-described steps all may utilize the steps known in the image forming method, for example, the steps described in JP-A-56-40868 and JP-A-49-91231. Also, the image forming method of the present invention may comprise a step other than those steps, and preferred examples of such a step include a cleaning step of removing the electrostatic image developer remaining on the electrostatic latent image-supporting member. In a preferred embodiment, the image forming method of the present invention further comprises a recycling step. This recycling step is a step of transferring the electrostatic image developing toner recovered in the cleaning step to the developer layer. The image forming method in this embodiment comprising a recycling step can be performed by using an image forming apparatus such as toner recycling system-type copying machine or facsimile machine. The image forming method of the present invention may also be applied to a recycling system in which the cleaning step is omitted and the toner is recovered simultaneously with the development.

As for the latent image-holding member, for example, an electrophotographic photoreceptor or a dielectric recording material may be used.

In the case of an electrophotographic photoreceptor, the surface of the electrophotographic photoreceptor is uniformly charged by a corotron charging device, a contact charging device or the like and then exposed to form an electrostatic latent image (latent image-forming step). Thereafter, the photoreceptor is caused to come in contact with or close to a developing roller having formed on the surface thereof a developer layer to allow for attachment of toner particles to the electrostatic latent image, thereby forming a toner image on the electrophotographic photoreceptor (development step). The toner image formed is transferred to the surface of a transferee member such as paper by using a corotron charging device or the like (transfer step). Furthermore, the toner image transferred to the surface of the transferee member is heat-fixed by a fixing machine to form a final toner image (fixing step).

At the heat-fixing by a fixing machine, a releasing agent is usually supplied to the fixing member of the fixing machine so as to prevent offset or the like.

EXAMPLES

The present invention is described in greater detail below by referring to Examples, but the present invention is not limited thereto.

The abbreviations of compounds used in Examples are as follows.

(Dicarboxylic Acid)

CHDA=1,4-cyclohexanedicarboxylic acid

PDAA=1,4-phenylenediacetic acid

PDPA=1,4-phenylenedipropanoic acid

TPA=terephthalic acid (Diol)

BisA1EO=1 ethylene oxide adduct of bisphenol A

BisA2EO=2 ethylene oxide adduct of bisphenol A

BisA5EO=5 ethylene oxide adduct of bisphenol A

BisA1PO=1 propylene oxide adduct of bisphenol A

BisA3PO=3 propylene oxide adduct of bisphenol A

BisA=bisphenol A (Catalyst)

DBSA=dodecylbenzenesulfonic acid p-TSA=p-toluenesulfonic acid

| (Production of Resin 1) | |
| --- | --- |
| CHDA | 17.5 parts by weight |
| BisA1EO | 31.0 parts by weight |
| DBSA | 0.15 parts by weight |

These materials are mixed and charged into a 200 ml-volume reactor equipped with a stirrer, and polycondensation is performed at 120° C. for 24 hours in a nitrogen atmosphere, as a result, a uniform and transparent non-crystalline polyester resin is obtained. This resin is sampled in a small amount, and the following physical properties of the sample are measured.

Weight average molecular weight by GPC: 15,600
Number average molecular weight by GPC: 5,720
Glass transition temperature (on-set): 57° C.

In the measurement of the molecular weight, the weight average molecular weight Mw and the number average molecular weight Mn are measured under the conditions described below by gel permeation chromatography (GPC). The measurement is performed at a temperature of 40° C. by passing a solvent (tetrahydrofuran) at a flow velocity of 1.2 ml/min, and injecting 3 mg as the sample weight of a tetrahydrofuran sample solution having a concentration of 0.2 g/20 ml. At the measurement of the molecular weight of a sample, the measurement conditions are selected such that the molecular weight of the sample is included in the range where a logarithm and a count number of a molecular weight in a calibration curve produced from several kinds of monodisperse polystyrene standard samples form a straight line.

In this connection, the reliability of the measurement results can be confirmed by the finding that an NBS706 polystyrene standard sample measured under the above-described conditions has:

weight average molecular weight $Mw = 28.8 \times 10^4$ number average molecular weight $Mn = 13.7 \times 10^4$ As for the column of GPC, a column satisfying the conditions above, such as TSK-GEL and GMH (produced by Tosoh Corp.), is used.

The glass transition temperature Tg of the polyester is measured by using a differential scanning calorimeter (DSC50, manufactured by Shimadzu Corp.).

| (Production of Resin 2) | |
| --- | --- |
| PDAA | 19.5 parts by weight |
| BisA2EO | 12.0 parts by weight (30 mol %) |
| BisA1EO | 22.0 parts by weight (70 mol %) |
| DBSA | 0.15 parts by weight |

These materials are mixed and charged into a 200 ml-volume reactor equipped with a stirrer, and polycondensation is performed at 120° C. for 24 hours in a nitrogen atmosphere, as a result, a uniform and transparent non-crystalline polyester resin is obtained. This resin is sampled in a small amount, and the following physical properties of the sample are measured.

Weight average molecular weight by GPC: 17,300
Number average molecular weight by GPC: 6,180
Glass transition temperature (on-set): 42° C.

| (Production of Resin 3) | |
| --- | --- |
| PDPA | 22.2 parts by weight |
| BisA1PO | 34.4 parts by weight |
| p-TSA | 0.07 parts by weight |

These materials are mixed and charged into a 200 ml-volume reactor equipped with a stirrer, and polycondensation is performed at 120° C. for 24 hours in a nitrogen atmosphere, as a result, a uniform and transparent non-crystalline polyester resin is obtained. This resin is sampled in a small amount, and the following physical properties of the sample are measured.

Weight average molecular weight by GPC: 11,000
Number average molecular weight by GPC: 3,680
Glass transition temperature (on-set): 39° C.

| (Production of Resin 4) | |
| --- | --- |
| CHDA | 17.5 parts by weight |
| BisA3PO | 57.6 parts by weight |
| Sulfuric acid | 0.01 parts by weight |

These materials are mixed and charged into a 200 ml-volume reactor equipped with a stirrer, and polycondensation is performed at 120° C. for 24 hours in a nitrogen atmosphere, as a result, a uniform and transparent non-crystalline polyester resin is obtained. This resin is sampled in a small amount, and the following physical properties of the sample are measured.

Weight average molecular weight by GPC: 9,500
Number average molecular weight by GPC: 3,400
Glass transition temperature (on-set): 35° C.

| (Production of Resin 5) | |
| --- | --- |
| CHDA | 17.5 parts by weight |
| BisA5EO | 66.8 parts by weight |
| DBSA | 0.15 parts by weight |

These materials are mixed and charged into a 200 ml-volume reactor equipped with a stirrer, and polycondensation is performed at 120° C. for 24 hours in a nitrogen atmosphere, as a result, a uniform and transparent non-crystalline polyester resin is obtained. This resin is sampled in a small amount, and the following physical properties of the sample are measured.

Weight average molecular weight by GPC: 9,100
Number average molecular weight by GPC: 2,200
Glass transition temperature (on-set): 30° C.

| (Production of Resin 6) | |
| --- | --- |
| Monomethyl 5-norbornene-2,3-dicarboxylate | 18.0 parts by weight |
| BisA1EO | 31.0 parts by weight |
| DBSA | 0.15 parts by weight |

These materials are mixed and charged into a 200 ml-volume reactor equipped with a stirrer, and polycondensation is performed at 120° C. for 24 hours in a nitrogen atmosphere, as a result, a uniform and transparent non-crystalline polyester resin is obtained. This resin is sampled in a small amount, and the following physical properties of the sample are measured.

Weight average molecular weight by GPC: 6,700
Number average molecular weight by GPC: 2,050
Glass transition temperature (on-set): 27° C.

| (Production of Resin 7) | |
|---|---|
| CHDA | 17.5 parts by weight |
| BisA1EO | 31.0 parts by weight |
| DBSA | 0.15 parts by weight |

These materials are mixed and charged into a 200 ml-volume reactor equipped with a stirrer, and polycondensation is performed at 60° C. for 24 hours in a nitrogen atmosphere, as a result, a white non-crystalline polyester resin is obtained. This resin is sampled in a small amount, and the following physical properties of the sample are measured.

Weight average molecular weight by GPC: 6,300
Number average molecular weight by GPC: 1,820
Glass transition temperature (on-set): 30° C.

| (Production of Resin 8) | |
|---|---|
| CHDA | 17.5 parts by weight |
| BisA1EO | 31.0 parts by weight |
| Dibutyltin oxide | 0.01 part by weight |
| DBSA | 0.14 parts by weight |

These materials are mixed and charged into a 200 ml-volume reactor equipped with a stirrer, and polycondensation is performed at 120° C. for 24 hours in a nitrogen atmosphere, as a result, a transparent non-crystalline polyester resin is obtained. This resin is sampled in a small amount, and the following physical properties of the sample are measured.

Weight average molecular weight by GPC: 8,600
Number average molecular weight by GPC: 3,350
Glass transition temperature (on-set): 35° C.

| (Production of Resin 9) | |
|---|---|
| TPA | 16.5 parts by weight |
| BisA1EO | 31.0 parts by weight |
| DBSA | 0.15 parts by weight |

These materials are mixed and charged into a 200 ml-volume reactor equipped with a stirrer, and polycondensation is performed at 120° C. for 24 hours in a nitrogen atmosphere, as a result, a low viscous liquid in a white turbid state is obtained and the presence of a white residual matter in the reactor bottom is confirmed.

This liquid is sampled in a small amount and when the molecular weight thereof is measured by GPC, the weight average molecular weight is 374 and the number average molecular weight is 296, revealing that the polymerization did not proceed.

| (Production of Resin 10) | |
|---|---|
| Biphenyldicarboxylic acid | 24.0 parts by weight |
| BisA2EO | 40.4 parts by weight |
| DBSA | 0.15 parts by weight |

These materials are mixed and charged into a 200 ml-volume reactor equipped with a stirrer, and polycondensation is performed at 120° C. for 24 hours in a nitrogen atmosphere, as a result, a non-crystalline polyester resin in a white turbid state is obtained. In the reactor after the completion of reaction, a white precipitate is observed. This resin is sampled in a small amount, and the following physical properties of the sample are measured.

Weight average molecular weight by GPC: 1,280
Number average molecular weight by GPC: 660
Glass transition temperature (on-set): 31° C.

| (Production of Resin 11) | |
|---|---|
| CHDA | 17.5 parts by weight |
| BisA | 23.0 parts by weight |
| DBSA | 0.15 parts by weight |

These materials are mixed and charged into a 200 ml-volume reactor equipped with a stirrer, and polycondensation is performed at 120° C. for 24 hours in a nitrogen atmosphere, as a result, a non-crystalline polyester resin in a white turbid state is obtained. In the reactor after the completion of reaction, a white precipitate is observed. This resin is sampled in a small amount, and the following physical properties of the sample are measured.

Weight average molecular weight by GPC: 1,020
Number average molecular weight by GPC: 480
Glass transition temperature (on-set): 25° C.

| (Production of Resin 12) | |
|---|---|
| CHDA | 7.0 parts by weight |
| TPA | 10.0 parts by weight |
| BisA1EO | 31.0 parts by weight |
| DBSA | 0.15 parts by weight |

These materials are mixed and charged into a 200 ml-volume reactor equipped with a stirrer, and polycondensation is performed at 120° C. for 24 hours in a nitrogen atmosphere, as a result, a non-crystalline polyester resin in a white turbid state is obtained. In the reactor after the completion of reaction, a white precipitate is observed. This resin is sampled in a small amount, and the following physical properties of the sample are measured.

Weight average molecular weight by GPC: 1,375
Number average molecular weight by GPC: 996
Glass transition temperature (on-set): 25° C.

| (Production of Resin 13) | |
|---|---|
| TPA | 16.5 parts by weight |
| BisA | 22.8 parts by weight |
| Dibutyltin oxide | 0.10 part by weight |

These materials are mixed and charged into a 200 ml-volume reactor equipped with a stirrer, and polycondensation is performed at 120° C. for 24 hours in a nitrogen atmosphere, as a result, a low viscous liquid in a white turbid state is obtained and the presence of a white residual matter in the reactor bottom is confirmed. This liquid is sampled in a small amount and when the molecular weight thereof is measured by GPC, the weight average molecular weight is 401 and the number average molecular weight is 391, revealing that the polymerization did not proceed.

| (Production of Resin 14) | |
|---|---|
| CHDA | 17.5 parts by weight |
| BisA1EO | 31.0 parts by weight |
| Dibutyltin oxide | 0.025 parts by weight |
| DBSA | 0.11 parts by weight |

These materials are mixed and charged into a 200 ml-volume reactor equipped with a stirrer, and polycondensation is performed at 120° C. for 24 hours in a nitrogen atmosphere, as a result, a transparent non-crystalline polyester resin is obtained. This resin is sampled in a small amount, and the following physical properties of the sample are measured.
Weight average molecular weight by GPC: 5,400
Number average molecular weight by GPC: 2,950
Glass transition temperature (on-set): 25° C.

| (Production of Resin 15) | |
|---|---|
| CHDA | 17.5 parts by weight |
| BisA1EO | 31.0 parts by weight |
| Dibutyltin oxide | 0.1 part by weight |

These materials are mixed and charged into a 200 ml-volume reactor equipped with a stirrer, and polycondensation is performed at 120° C. for 24 hours in a nitrogen atmosphere, as a result, a non-crystalline polyester resin in a white turbid state is obtained. This resin is sampled in a small amount, and the following physical properties of the sample are measured.
Weight average molecular weight by GPC: 870
Number average molecular weight by GPC: 715
Glass transition temperature (on-set): 25° C.

(Evaluation of Low-Temperature Polycondensation Property)

In the production of these resins, the low-temperature polycondensation property is evaluated as follows.

○: The weight average molecular weight is 10,000 or more or the number average molecular weight is 3,000 or more.

Δ: The weight average molecular weight is from 3,000 to less than 10,000 or the number average molecular weight is from 1,000 to less than 3,000.

X: The weight average molecular weight is less than 3,000 or the number average molecular weight is less than 1,000.

TABLE 1

| | Dicarboxylic Acid | Ratio | OH | Ratio | Catalyst | Reaction Temperature (° C.)/hour | Mw | Mn | Mw/Mn | Tg (° C.) | Evaluation of Low-Temperature Polycondensation Property | Amount of Catalyst-Originated Metal Detected |
|---|---|---|---|---|---|---|---|---|---|---|---|---|
| 1 | CHDA | 100 | BisA1EO | 100 | DBSA | 120/24 hr | 15,600 | 5,720 | 2.73 | 57 | ○ | 0 |
| 2 | PDAA | 100 | BisA2EO/BisA1EO | 30/70 | DBSA | 120/24 hr | 17,300 | 6,180 | 2.80 | 42 | ○ | 0 |
| 3 | PDPA | 100 | BisA1PO | 100 | p-TSA | 120/24 hr | 11,000 | 3,680 | 2.99 | 39 | ○ | 0 |
| 4 | CHDA | 100 | BisA3PO | 100 | sulfuric acid | 120/24 hr | 9,500 | 3,400 | 2.79 | 35 | ○ | 0 |
| 5 | CHDA | 100 | BisA5EO | 100 | DBSA | 120/24 hr | 9,100 | 2,200 | 4.13 | 30 | Δ | 0 |
| 6 | monomethyl 5-norbornene-2,3-dicarboxylate | 100 | BisA1EO | 100 | DBSA | 120/24 hr | 6,700 | 2,050 | 3.27 | 27 | Δ | 0 |
| 7 | CHDA | 100 | BisA1EO | 100 | DBSA | 60/24 hr | 6,300 | 1,820 | 3.46 | 30 | Δ | 0 |
| 8 | CHDA | 100 | BisA1EO | 100 | dibutyltin oxide/DBSA (1/14) | 120/24 hr | 8,600 | 3,350 | 2.57 | 35 | Δ | 50 ppm |
| 9 | TPA | 100 | BisA1EO | 100 | DBSA | 120/24 hr | 374 | 296 | — | — | — | 0 |
| 10 | biphenyl-carboxylic acid | 100 | BisA2EO | 100 | DBSA | 120/24 hr | 1,280 | 660 | 1.94 | 31 | X | 0 |
| 11 | CHDA | 100 | BisA | 100 | DBSA | 120/24 hr | 1,020 | 480 | 2.13 | 25 | X | 0 |
| 12 | CHDA/TPA | 7/10 | BisA1EO | 100 | DBSA | 120/24 hr | 1,375 | 996 | 1.38 | 25 | X | 0 |
| 13 | TPA | 100 | BisA | 100 | dibutyltin oxide | 120/24 hr | 401 | 391 | — | — | — | 580 ppm |
| 14 | CHDA | 100 | BisA1EO | 100 | dibutyltin oxide/DBSA (2.5/11) | 120/24 hr | 5,400 | 2,950 | 1.83 | 25 | Δ | 130 ppm |
| 15 | CHDA | 100 | BisA1EO | 100 | dibutyltin oxide | 120/24 hr | 870 | 715 | 1.22 | 25 | X | 580 ppm |

The amount of the catalyst-originated metal is measured by shaping the binder resin after drying into a disc and performing a quantitative analysis by means of a fluorescent X-ray analyzer Model XRF-1500 (manufactured by Shimadzu Corp.).

(Evaluation of Pulverization Property)

A pulverized toner is produced by using the polyester resin produced as above. That is, 96 parts by weight of each polyester resin and 4 parts by weight of a cyan pigment (Cyanine Blue 4933M, produced by Dainichiseika Color & Chemicals Mfg. Co., Ltd.) are mixed and stirred in a 75L Henschel mixer (manufactured by Mitsui Miike Machinery Co., Ltd.) and melt-kneaded by an extruder (TEM48BS, manufactured by Toshiba Machine Co., Ltd.) at a barrel temperature of 100° C. The kneaded material is shaped into a plate of about 1 cm in thickness by a pressure roll, subjected sequentially to coarse pulverization to about several millimeters by a Fitz mill-type pulverizer and to fine pulverization by an IDS-type pulverizer (supersonic pulverizer, Model IDS-5, manufactured by Nippon Pneumatic Mfg. Co., Ltd.), and classified by a wind-force classifier (Hibolter 300, manufactured by Shin-Tokyo Kikai) to obtain a non-external addition toner. The pulverization conditions in Model IDS-5 are a compressed air amount of 5.4 nm$^3$/min and a raw material feed amount of 100 to 150 g/min. The volume average particle distribution GSDv of this non-external addition toner is measured by using Multisizer III (manufactured by Nikkaki Co., Ltd.).

As external additives, based on the weight of the toner, 0.5 wt % of silica treated with hexamethyldisilazane having an average particle diameter of 40 nm and 0.7 wt % of a titanium compound (average particle diameter: 30 nm) obtained by treating a metatitanic acid with 50 wt % of isobutyltrimethoxysilane and firing it are added to the toner particles obtained above, and these are mixed in a 75L Henschel mixer for 10 minutes and then classified by a wind-force classifier (Hibolter 300, manufactured by Shin-Tokyo Kikai) to produce a toner.

The pulverization property is evaluated as follows.

◎: The volume average particle diameter is 8.0 μm or less and GSDv is 1.30 or less.

○: The volume average particle diameter is 9.0 μm or less or GSDv is 1.40 or less.

Δ: The volume average particle diameter is 10.0 μm or less or GSDv is 1.50 or less.

X: The volume average particle diameter is 10.0 μm or more and GSDv is 1.50 or more.

A toner composition obtained by using each toner produced above and using, as a carrier, an iron powder coated with a fluorine-containing acryl-based resin and having an average particle diameter of 50 μm is mixed to have a toner concentration of 8 wt %, thereby producing a developer. Using the produced developer as a full color toner set, an image is formed by a copier ("DCC1250 Modified Machine", manufactured by Fuji Xerox Co., Ltd.), and the image quality is evaluated by the following method.

Incidentally, Resin 15 is unusable as a pulverized toner and is not evaluated.

(Fine Line Reproducibility Evaluation Test)

A fine line image is formed on a photoreceptor to have a line width of 50 μm, transferred to a transfer material and fixed. The fine line image on the transfer material after fixing is observed at a magnification of 175 by using VH-6200 Micro-Hiscope (manufactured by Keyence Corp.).

The specific evaluation criteria are as follows. Rating ○ is acceptable.

○: Roughness in the edge part of fine line is scarcely observed.

Δ: Roughness in the edge part of fine line is generated to a recognizable extent.

X: Serious roughness is observed in the edge part of fine line.

TABLE 2

| | Resin Used | Evaluation | Pulverization Dv50 | Pulverization GSCv | Evaluation of Image Quality |
|---|---|---|---|---|---|
| Example 1 | 1 | ◎ | 7.1 | 1.26 | ○ |
| Example 2 | 2 | ◎ | 7.4 | 1.29 | ○ |
| Example 3 | 3 | ◎ | 7.9 | 1.30 | ○ |
| Example 4 | 4 | ○ | 8.8 | 1.33 | ○ |
| Example 5 | 5 | ○ | 9.5 | 1.36 | Δ |
| Example 6 | 6 | ○ | 9.5 | 1.39 | Δ |
| Example 7 | 7 | Δ | 10.1 | 1.44 | Δ |
| Example 8 | 8 | Δ | 10.9 | 1.40 | Δ |
| Comparative Example 1 | 10 | Δ | 12.6 | 1.48 | X |
| Comparative example 2 | 11 | X | 15.1 | 1.66 | X |
| Comparative Example 3 | 12 | X | 14.2 | 1.67 | X |
| Comparative Example 4 | 14 | X | 10.6 | 1.51 | X |

(Evaluation of Water Dispersibility (Emulsifiability) of Resin)

Resin 1 is charged into a three-neck flask equipped with a stirrer and a condenser tube, kept at 95° C. and continuously stirred while gradually adding 1N NaOH. When 50 g in total of the aqueous NaOH solution is charged, the resin turned into a slurry state. This slurry is charged into a flask containing 180 g of ion exchanged water adjusted to 85° C., emulsified in a homogenizer (Ultra-Turrax, manufactured by IKA Works, Inc.) (hereinafter the same) for 10 minutes and further emulsified in an ultrasonic wave bath for 10 minutes, and then the flask is cooled in water at room temperature.

In this way, Polyester Resin Particle Liquid Dispersion (1) having a resin median diameter of 420 nm is obtained.

Using Resins 2 to 8, 10 to 12, 14 and 15, Resin Particle Liquid Dispersions (2) to (13) are produced in the same manner. The emulsifiability of resin is evaluated by measuring the resin dispersion diameter of these resin liquid dispersions. The median diameter of the resin particle is measured by using a laser diffraction-type particle size distribution measuring device (LA-920, manufactured by Horiba Ltd.).

The emulsifiability of resin is evaluated as follows.

◎: The median diameter of resin particle liquid dispersion is less than 600 nm.

○: The median diameter of resin particle liquid dispersion is from 600 nm to less than 1,000 nm.

Δ: The median diameter of resin particle liquid dispersion is from 1,000 nm to less than 1,500 nm.

X: The median diameter of resin particle liquid dispersion is 1,500 nm or more.

TABLE 3

| | Resin Used | Emulsifiability | Median Diameter (nm) |
|---|---|---|---|
| Resin Liquid Dispersion 1 | 1 | ◎ | 480 |
| Resin Liquid Dispersion 2 | 2 | ◎ | 560 |
| Resin Liquid Dispersion 3 | 3 | ○ | 620 |
| Resin Liquid Dispersion 4 | 4 | ○ | 880 |
| Resin Liquid Dispersion 5 | 5 | ○ | 790 |

TABLE 3-continued

|  | Resin Used | Emulsifiability | Median Diameter (nm) |
|---|---|---|---|
| Resin Liquid Dispersion 6 | 6 | ○ | 890 |
| Resin Liquid Dispersion 7 | 7 | Δ | 1,060 |
| Resin Liquid Dispersion 8 | 8 | Δ | 1,110 |
| Resin Liquid Dispersion 9 | 10 | X | 4,390 |
| Resin Liquid Dispersion 10 | 11 | X | 6,820 |
| Resin Liquid Dispersion 11 | 12 | Δ | 1,360 |
| Resin Liquid Dispersion 12 | 14 | Δ | 1,280 |
| Resin Liquid Dispersion 13 | 15 | X | 5,650 |

A toner is produced by using the resin liquid dispersion produced as above.

(Preparation of Releasing agent Particle Liquid Dispersion (W1))

| Polyethylene wax (Polywax 725, produced by Toyo-Petrolite K.K., melting point: 103° C.) | 30 parts by weight |
|---|---|
| Cationic surfactant (Sanizol B50, Kao Corp.) | 3 parts by weight |
| Ion exchanged water | 67 parts by weight |

These components are thoroughly dispersed by a homogenizer (Ultra-Turrax T50, manufactured by IKA Works, Inc.) under heating at 95° C. and then dispersed by a pressure jet-type homogenizer (Gaulin Homogenizer, manufactured by Gaulin) to prepare Releasing Agent Particle Liquid Dispersion (W1). The number average particle diameter D50n of releasing agent particles in the obtained liquid dispersion is 4,600 nm. Thereafter, ion exchanged water is added to adjust the solid concentration of the liquid dispersion to 30%.

(Preparation of Cyan Pigment Liquid Dispersion (C1))

| Cyan pigment (PB15:3, produced by Dainichiseika Color & Chemicals Mfg. Co., Ltd.) | 20 parts by weight |
|---|---|
| Anionic surfactant (Neogen R, produced by Dai-ichi Kogyo Seiyaku Co., Ltd.) | 2 parts by weight |
| Ion exchanged water | 78 parts by weight |

These components are dispersed by a homogenizer (Ultra-Turrax T50, manufactured by IKA Works, Inc.) at 3,000 rpm for 2 minutes, thereby causing the pigment to get affinity for water, and further dispersed at 5,000 rpm for 10 minutes. The resulting dispersion is stirred for one day and night by an ordinary stirrer to effect defoaming and then dispersed under a pressure of 240 MPa for about 1 hour by using a high pressure impact-type dispersing machine Altimizer (HJP30006, manufactured by Sugino Machine Ltd.) to obtain Magenta Pigment Liquid Dispersion (MN1). The number average particle diameter D50n of the pigment in the liquid dispersion is 121 nm. Thereafter, ion exchanged water is added to adjust the solid concentration of the liquid dispersion to 15%.

(Preparation of Resin Particle Liquid Dispersion A)

| Styrene | 460 parts by weight |
|---|---|
| n-Butyl acrylate | 140 parts by weight |
| Acrylic acid | 12 parts by weight |
| Dodecanethiol | 9 parts by weight |

These components are mixed and dissolved to prepare a solution.

Separately, 12 parts by weight of an anionic surfactant (Dowfax, produced by Rhodia, Inc.) is dissolved in 250 parts by weight of ion exchanged water, and the solution prepared above is added thereto, followed by dispersion and emulsification in a flask (Monomer Emulsion A).

Furthermore, 1 part by weight of an anionic surfactant (Dowfax, produced by Rhodia, Inc.) is dissolved in 555 parts by weight of ion exchanged water, and the resulting solution is charged into a polymerization flask.

The polymerization flask is tightly plugged and after connecting a reflux tube thereto, the polymerization flask is heated to 75° C. on a water bath with slow stirring while injecting nitrogen, and this condition is maintained.

9 Parts by weight of ammonium persulfate is dissolved in 43 parts by weight of ion exchanged water, and the resulting solution is added dropwise to the polymerization flask through a metering pump over 20 minutes, and then Monomer Emulsion A is also added dropwise through a metering pump over 200 minutes.

Thereafter, the polymerization flask is maintained at 75° C. for 3 hours while continuing slowly stirring to complete the polymerization.

In this way, Anionic Resin Particle Liquid Dispersion A containing resin particles with a median diameter of 520 nm, a glass transition point of 61.0° C. and a weight average molecular weight of 36,000, and having a solid content of 42% is obtained.

Toner Example 1

(Production of Cyan Toner (Toner C1))

| Resin Particle Liquid Dispersion (1) | 120 parts by weight |
|---|---|
| Resin Particle Liquid Dispersion A | 40 parts by weight |
| Releasing Agent Particle Liquid Dispersion (W1) | 33 parts by weight |
| Cyan Pigment Liquid Dispersion (C1) | 60 parts by weight |
| An aqueous 10 wt % polyaluminum chloride solution (PAC100W, produced by Asada Kagaku K.K.) | 15 parts by weight |
| An aqueous 1% nitric acid solution | 3 parts by weight |

These components are dispersed by using a homogenizer (Ultra-Turrax T50, manufactured by IKA Works, Inc.) at 5,000 rpm for 3 minutes in a round-shaped stainless steel-made flask, and then a lid equipped with a stirrer having magnetic seal, a thermometer and a pH meter is put on the flask. Thereafter, a mantle heater for heating is set, and the flask is heated to 62° C. at a rate of 1° C./min with stirring under appropriate control to a minimum rotation number necessary for stirring the entire liquid dispersion in the flask. The temperature is kept at 62° C. for 30 minutes, and the particle diameter of aggregate particles is confirmed by a Coulter counter (TA II, manufactured by Nikkaki K.K.). Immediately after stopping of the temperature elevation, 50 parts by weight of Resin Particle Liquid Dispersion (1) is added, and this condition is kept for 30 minutes. Subsequently, an aqueous sodium hydroxide solution is added until the pH of the system became 6.5, and then the system is heated to 97° C. at 1° C./min. After the elevation of temperature, an aqueous nitric acid solution is added to adjust the pH of the system to 5.0, and this condition is kept for 10 hours to coalesce aggregate particles under heat. Thereafter, the temperature of the system is lowered to 50° C., and an aqueous sodium hydroxide solution is added to adjust the pH to 12.0. After keeping this condition for 10 minutes, the resulting dispersion is taken out from the flask, thoroughly filtrated and flow-washed by using ion exchanged water, and further dispersed in ion exchanged water to give a solid content of 10 wt %. The pH is then adjusted to 3.0 by adding a nitric acid and after stirring for 10 minutes, the dispersion is again thoroughly filtrated and flow-washed by using ion exchanged water. The resulting slurry is freeze-dried to obtain a cyan toner (Toner C1).

Thereafter, a silica ($SiO_2$) particle subjected to a surface hydrophobing treatment with hexamethyldisilazane (hereinafter sometimes simply referred to as "HMDS") and having an average primary particle diameter of 40 nm, and a metatitanic acid compound particle having an average primary particle diameter of 20 nm, which is a reaction product of metatitanic acid and isobutyltrimethoxysilane, are added each in an amount of 1 wt % to the cyan toner obtained above, and mixed in a Henschel mixer to produce a cyan external addition toner.

The volume average particle diameter $D_{50}$ and volume average particle distribution GSDv of the thus-produced toner are measured by a laser diffraction-type particle size distribution measuring device (LA-700, manufactured by Horiba Ltd.). Also, the shape factor (SF1) of the toner particle is determined by observing the shape by means of Luzex.

Toner Examples 2 to 8

Cyan toners are obtained in the same manner as in Toner Example 1 except for changing Resin Particle Liquid Dispersion 1 to Resin Particle Liquid Dispersions 2 to 8, respectively, and the volume average particle diameter $D_{50}$, the volume average particle distribution GSDv and the shape factor (SF1) are measured. Similarly to Toner Example 1, external additives are externally added to the toner to obtain a cyan external addition toner.

Toner Comparative Examples 1 to 5

Cyan toners are obtained in the same manner as in Toner Example 1 except for changing Resin Particle Liquid Dispersion 1 to Resin Particle Liquid Dispersions 10 to 12, 14 and 15, respectively, and the volume average particle diameter $D_{50}$, the volume average particle distribution GSDv and the shape factor (SF1) are measured. Similarly to Toner Example 1, external additives are externally added to the toner to obtain a cyan external addition toner.

(Production of Carrier)

A methanol solution containing 0.1 part by weight of γ-aminopropyltriethoxysilane is added to 100 parts by weight of Cu—Zn ferrite particles having a volume average particle diameter of 40 μm and after coating the particles in a kneader, methanol is removed by distillation. The obtained silane compound is heated at 120° C. for 2 hours and thereby completely hardened. The particles obtained are mixed with a perfluorooctylethyl methacrylate-methyl methacrylate copolymer (copolymerization ratio: 40:60) dissolved in toluene, and the resulting mixture is subjected to a vacuum kneader to produce a resin-coated carrier in which the coverage of the perfluorooctylethyl methacrylate-methyl methacrylate copolymer is 0.5 wt %.

(Production of Developer)

100 Parts by weight of the thus-obtained resin-coated carrier is mixed with 4 parts by weight of each of the toners produced above to produce an electrostatic image developer. These developers are used as the developer in the following evaluations.

The following evaluation of image quality is performed by using each cyan developer produced above and also, the thermal storability of powder is evaluated by using each toner.

The image quality is evaluated as follows.

(Fine Line Reproducibility Evaluation Test)

A fine line image is formed on a photoreceptor to have a line width of 50 μm, transferred to a transfer material and fixed. The fine line image on the transfer material after fixing is observed at a magnification of 175 by using VH-6200 Micro-Hiscope (manufactured by Keyence Corp.).

The specific evaluation criteria are as follows. Rating ◯ is acceptable.

◯: Roughness in the edge part of fine line is scarcely observed.

Δ: Roughness in the edge part of fine line is generated to a recognizable extent.

X: Serious roughness is observed in the edge part of fine line.

The thermal storability (heat blocking resistance) of the toner is evaluated as follows.

(Evaluation of Thermal Storability (Heat Blocking Resistance) of Toner)

First, 5 g of the toner is left standing in a chamber at 40° C. and 50% RH for 17 hours. After returning the temperature to room temperature, 2 g of the toner is charged into a mesh having a sieve opening of 45 μm and vibrated under fixed conditions. The weight of the toner remaining on the mesh is measured, and the weight ratio to the amount charged is calculated. The obtained numerical value is used as the index for heat blocking resistance of the toner.

The thermal storability of the toner is rated ◎ when the index of heat blocking resistance is 3% or less, ◯ when more than 3% to 5%, Δ when more than 5% to 10%, and X when more than 10%.

TABLE 4

|  | Resin Used | $D_{50}$ | GSDv | Shape Factor | Image Quality | Thermal Storability |
|---|---|---|---|---|---|---|
| Toner Example 1 | 1 | 6.1 | 1.22 | 129 | ◯ | ◎ |
| Toner Example 2 | 2 | 6.0 | 1.23 | 128 | ◯ | ◎ |
| Toner Example 3 | 3 | 6.1 | 1.26 | 130 | ◯ | ◯ |
| Toner Example 4 | 4 | 6.2 | 1.27 | 125 | ◯ | ◯ |
| Toner Example 5 | 5 | 6.3 | 1.30 | 122 | Δ | Δ |
| Toner Example 6 | 6 | 6.4 | 1.29 | 125 | ◯ | Δ |
| Toner Example 7 | 7 | 6.4 | 1.32 | 126 | Δ | Δ |
| Toner Example 8 | 8 | 6.3 | 1.35 | 125 | Δ | Δ |
| Toner Comparative Example 1 | 10 | 6.5 | 1.48 | 123 | X | Δ |
| Toner Comparative Example 2 | 11 | 6.6 | 1.61 | 119 | X | X |
| Toner Comparative Example 3 | 12 | 6.6 | 1.42 | 118 | X | X |
| Toner Comparative Example 4 | 14 | 6.4 | 1.41 | 122 | X | Δ |
| Toner Comparative Example 5 | 15 | 6.6 | 1.51 | 116 | X | X |

In the present invention, by employing the above-described constitutions, polycondensation of a polyester at a low temperature becomes possible and both production of a toner ensuring high image quality and production with a low energy can be realized.

The entire disclosure of Japanese Patent Application No. 2005-246136 filed on Aug. 26, 2005 including specification, claims, drawings and abstract is incorporated herein by reference in its entirely.

What is claimed is:

1. A binder resin for an electrostatic image developing toner, obtained by polycondensation reaction of a polycarboxylic acid and a polyol, wherein the polycarboxylic acid comprises at least one of a compound represented by formula (1) and a compound represented by formula (2) in an amount of from 50 to 100 mol %, the polyol comprises a compound represented by formula (3) in an amount of from 50 to 100 mol %, and a content of a catalyst-originated metal element in the resin is 100 ppm or less:

$$R^1OOCA^1{}_mB^1{}_nA^1{}_lCOOR^{1'} \quad (1)$$

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$);

$$R^2OOCA^2{}_pB^2{}_qA^2{}_rCOOR^{2'} \quad (2)$$

(wherein $A^2$ is a methylene group, $B^2$ is an alicyclic hydrocarbon group, $R^2$ and $R^{2'}$ each is a hydrogen atom or a monovalent hydrocarbon group, $0 \leq p \leq 6$, $0 \leq r \leq 6$, and $1 \leq q \leq 3$);

$$HOX_hY_jX_kOH \quad (3)$$

(wherein X is an alkylene oxide group, Y is a bisphenol structure group, $1 \leq h+k \leq 10$, and $1 \leq j \leq 3$).

2. The binder resin for an electrostatic image developing toner according to claim 1, wherein the aromatic hydrocarbon group in formula (1) has a structure in which a carbon number of a main structure is from C6 to C18.

3. The binder resin for an electrostatic image developing toner according to claim 1, wherein in formula (1), the aromatic hydrocarbon group has at least one of a benzene ring structure and a naphthalene ring structure.

4. The binder resin for an electrostatic image developing toner according to claim 1, wherein the alicyclic hydrocarbon group in formula (2) has a structure in which a carbon number of a main structure is from C3 to C12.

5. The binder resin for an electrostatic image developing toner according to claim 1, wherein in formula (2), the alicyclic hydrocarbon group has at least one structure selected from the group consisting of cyclobutane, cyclohexane and cyclohexene structures.

6. The binder resin for an electrostatic image developing toner according to claim 1, wherein the binder resin has a glass transition temperature of from 30 to 75° C.

7. The binder resin for an electrostatic image developing toner according to claim 1, which has a weight average molecular weight of 5,000 to 50,000.

8. A process for producing a binder resin for an electrostatic image developing toner according to claim 1, comprising a step of polycondensing a polycarboxylic acid and a polyol, wherein the polycarboxylic acid comprises at least one of a compound represented by formula (1) and a compound represented by formula (2) in an amount of from 50 to 100 mol %, the polyol comprises a compound represented by formula (3) in an amount of from 50 to 100 mol %, and a content of a catalyst-originated metal element in the resin is 100 ppm or less:

$$R^1OOCA^1{}_mB^1{}_nA^1{}_lCOOR^{1'} \quad (1)$$

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$);

$$R^2OOCA^2{}_pB^2{}_qA^2{}_rCOOR^{2'} \quad (2)$$

(wherein $A^2$ is a methylene group, $B^2$ is an alicyclic hydrocarbon group, $R^2$ and $R^{2'}$ each is a hydrogen atom or a monovalent hydrocarbon group, $0 \leq p \leq 6$, $0 \leq r \leq 6$, and $1 \leq q \leq 3$);

$$HOX_hY_jX_kOH \quad (3)$$

(wherein X is an alkylene oxide group, Y is a bisphenol structure group, $1 \leq h+k \leq 10$, and $1 \leq j \leq 3$).

9. The process for producing a binder resin for an electrostatic image developing toner according to claim 8, wherein a Broensted acid-based catalyst is used at the polycondensation reaction.

10. The process for producing a binder resin for an electrostatic image developing toner according to claim 8, wherein the polycondensation reaction is performed at a temperature of 70 to 150° C.

11. A binder resin liquid dispersion for an electrostatic image developing toner, in which the binder resin for an electrostatic image developing toner according to claim 1 is dispersed.

12. A process for producing an electrostatic image developing toner, comprising:

a step of aggregating a binder resin in a liquid dispersion comprising a binder resin liquid dispersion to obtain aggregate particles; and a step of heating and coalescing the aggregate particles, wherein the binder resin liquid dispersion is the binder resin liquid dispersion for an electrostatic image developing toner according to claim 11.

13. An electrostatic image developing toner produced by the production process according to claim 12.

14. An electrostatic image developing toner according to claim 13, further comprising a releasing agent.

15. An electrostatic image developing toner according to claim 13, which has a volume average particle distribution GSDv of 1.4 or less.

16. An electrostatic image developing toner according to claim 13, which has a shape factor SF1 of from 100 to 140.

17. An electrostatic image developer comprising:

the electrostatic image developing toner according to claim 13; and a carrier.

18. An image forming method comprising:

a latent image-forming step of forming an electrostatic latent image on a surface of a latent image-holding member;

a development step of developing the electrostatic latent image formed on the surface of the latent image-holding member with a toner or an electrostatic image developer to form a toner image;

a step of transferring the toner image formed on the surface of the latent image-holding member to a surface of a transferee member; and a fixing step of heat-fixing the toner image transferred to the surface of the transferee member, wherein the developer is the electrostatic image developer according to claim 17.

19. An image forming method comprising:

a latent image-forming step of forming an electrostatic latent image on a surface of a latent image-holding member;

a development step of developing the electrostatic latent image formed on the surface of the latent image-holding member with a toner or an electrostatic image developer to form a toner image;

a step of transferring the toner image formed on the surface of the latent image-holding member to a surface of a transferee member; and a fixing step of heat-fixing the toner image transferred to the surface of the transferee member, wherein the toner is the electrostatic image developing toner according to claim 13.

20. An electrostatic image developing toner produced by kneading and pulverizing the binder resin for an electrostatic image developing toner according to claim 1.

21. An electrostatic image developer comprising:

the electrostatic image developing toner according to claim 20; and a carrier.

22. An image forming method comprising:

a latent image-forming step of forming an electrostatic latent image on a surface of a latent image-holding member;

a development step of developing the electrostatic latent image formed on the surface of the latent image-holding member with a toner or an electrostatic image developer to form a toner image;

a step of transferring the toner image formed on the surface of the latent image-holding member to a surface of a transferee member; and a fixing step of heat-fixing the toner image transferred to the surface of the transferee member, wherein the developer is the electrostatic image developer according to claim 21.

* * * * *